US007191467B1

(12) United States Patent
Dujari et al.

(10) Patent No.: US 7,191,467 B1
(45) Date of Patent: Mar. 13, 2007

(54) METHOD AND SYSTEM OF INTEGRATING THIRD PARTY AUTHENTICATION INTO INTERNET BROWSER CODE

(75) Inventors: Rajeev Dujari, Kirkland, WA (US); Biao Wang, Bellevue, WA (US); John M. Hawkins, Duvall, WA (US); Yordan Rouskov, Sammamish, WA (US); Samim Erdogan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 678 days.

(21) Appl. No.: 10/099,403

(22) Filed: Mar. 15, 2002

(51) Int. Cl.
*G06F 7/04* (2006.01)
*G06F 7/58* (2006.01)
*G06F 15/16* (2006.01)
*G06F 17/30* (2006.01)
*G06K 9/00* (2006.01)
*G06K 19/00* (2006.01)
*H04L 9/32* (2006.01)
*G06F 15/177* (2006.01)
*G06F 3/00* (2006.01)
*G06F 9/00* (2006.01)

(52) U.S. Cl. .................. 726/5; 726/7; 726/8; 726/9; 726/10; 726/27; 726/28; 726/29; 726/30; 713/171; 713/151; 709/220; 709/228; 709/230; 709/225; 715/744

(58) Field of Classification Search .............. 713/171, 713/202, 151, 152; 709/220, 228, 230, 225; 395/187, 188

See application file for complete search history.

(56) References Cited

U.S. PATENT DOCUMENTS

| 5,235,642 | A | | 8/1993 | Wobber et al. | |
|---|---|---|---|---|---|
| 5,241,594 | A | | 8/1993 | Kung | |
| 5,497,463 | A | | 3/1996 | Stein et al. | |
| 6,058,480 | A | * | 5/2000 | Brown | 713/201 |
| 6,421,768 | B1 | | 7/2002 | Purpura | |
| 6,691,232 | B1 | * | 2/2004 | Wood et al. | 713/201 |
| 6,753,887 | B2 | | 6/2004 | Carolan et al. | |
| 6,775,772 | B1 | * | 8/2004 | Binding et al. | 713/171 |
| 6,959,336 | B2 | | 10/2005 | Moreh et al. | |

(Continued)

OTHER PUBLICATIONS

Pinfield, Stephen; Eaton, Jonathan; Edwards, Catherine; "Realizing the Hybrid Library," Oct. 1998, [29 pages].

(Continued)

*Primary Examiner*—Ayaz Sheikh
*Assistant Examiner*—Shin-Hon Chen
(74) *Attorney, Agent, or Firm*—Merchant & Gould P.C.

(57) ABSTRACT

A method and system for using an Internet client's local authentication mechanism in systems having updated browser code, so as to enable third party authentication according to an authentication scheme specified by a participating server on clients with updated browser code, while not breaking clients with legacy browser code. A redirect response from a server has authentication data added thereto such that updated browser code can detect the data's presence and enable the use of local security mechanisms for authentication purposes with the server-specified authentication scheme, including local credential entry for verification at a third party login server. At the same time, if such a redirect response is received by prior browser code, the added data is ignored while conventional redirection occurs, such that third party authentication may be performed via redirection to a third party's Internet page that provides a form for credential entry.

24 Claims, 17 Drawing Sheets

U.S. PATENT DOCUMENTS

| | | |
|---|---|---|
| 6,977,906 B2 | 12/2005 | Owens et al. |
| 7,016,875 B1 | 3/2006 | Steele et al. |
| 7,036,142 B1 | 4/2006 | Zhang et al. |
| 7,039,679 B2 | 5/2006 | Mendez et al. |
| 2002/0112155 A1* | 8/2002 | Martherus et al. .......... 713/155 |
| 2002/0156905 A1* | 10/2002 | Weissman ................... 709/229 |
| 2003/0105862 A1* | 6/2003 | Villavicencio .............. 709/225 |
| 2005/0060584 A1 | 3/2005 | Ginter et al. |
| 2005/0074126 A1* | 4/2005 | Stanko ....................... 380/279 |

OTHER PUBLICATIONS

Adamson, William A.; Rees, Jim; Honeyman, Peter; "Joining Security Realms: A Single Login for Netware and Kerberos," Proceedings of the Fifth USENIX UNIX Security Symposium, Jun. 1995, [11 pages].

Kormann, David P.; Rubin, Aviel D.; "Risks of the Passport Single Signon Protocol," Jun. 2000, [17 pages].

* cited by examiner

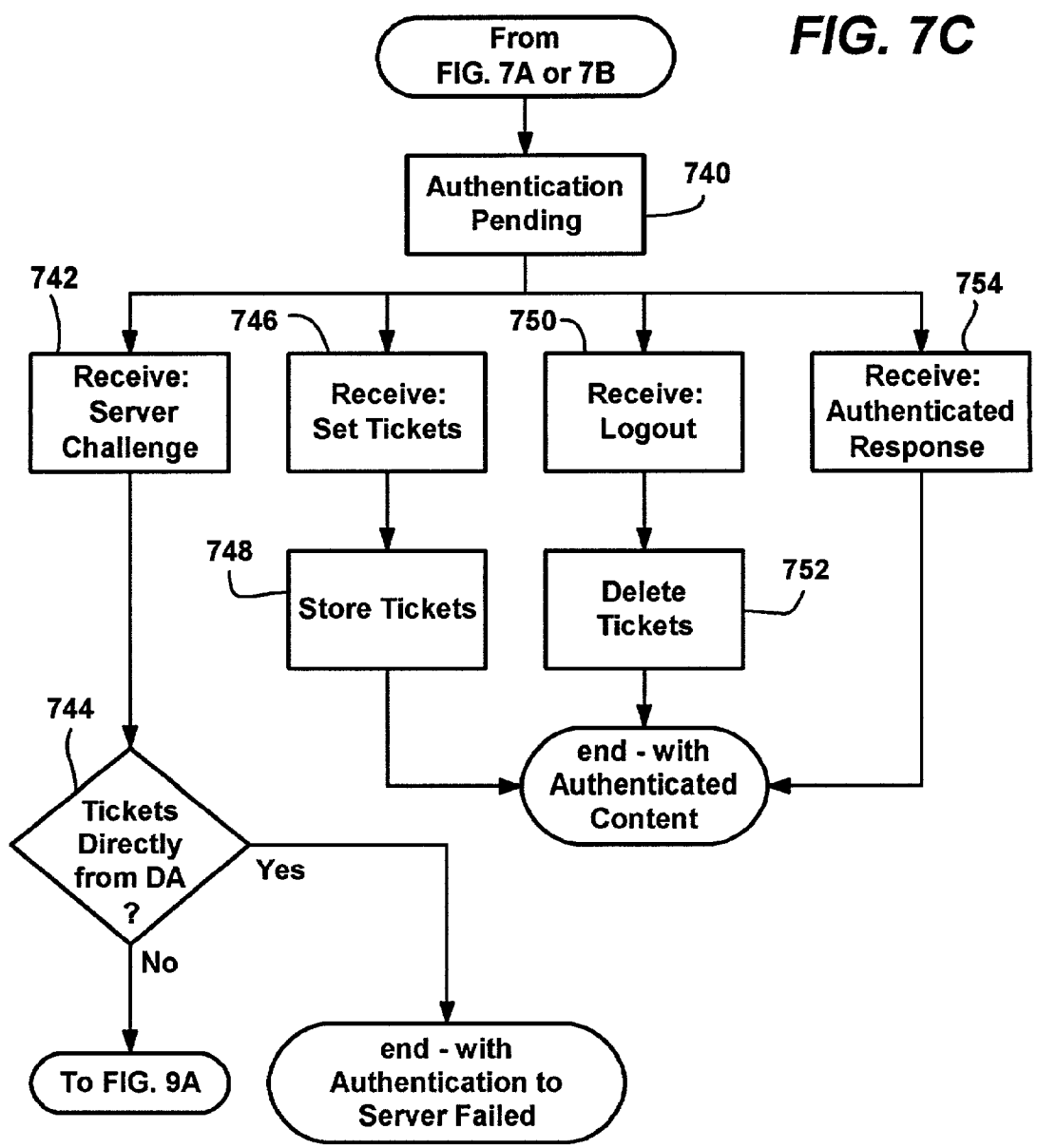

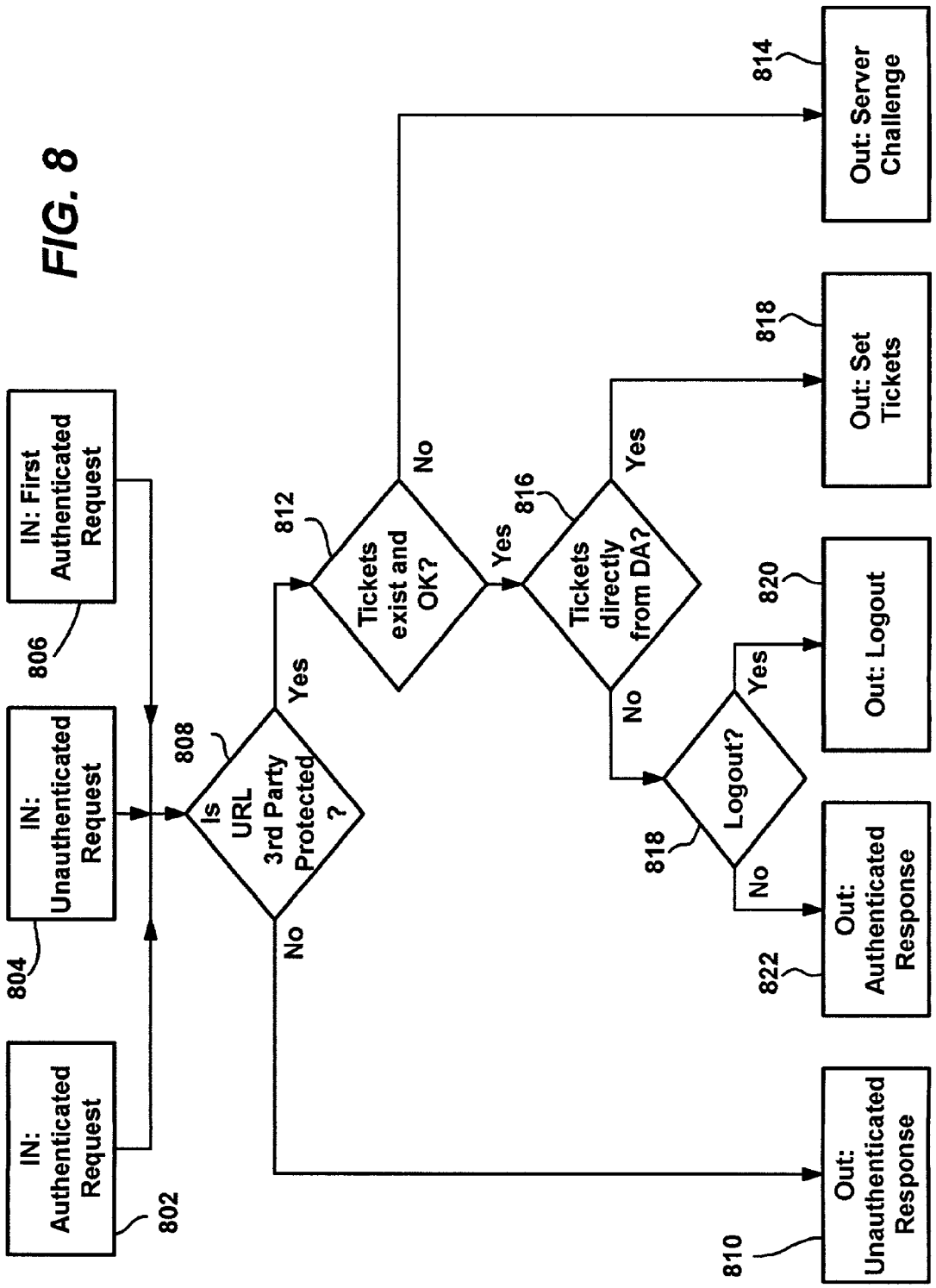

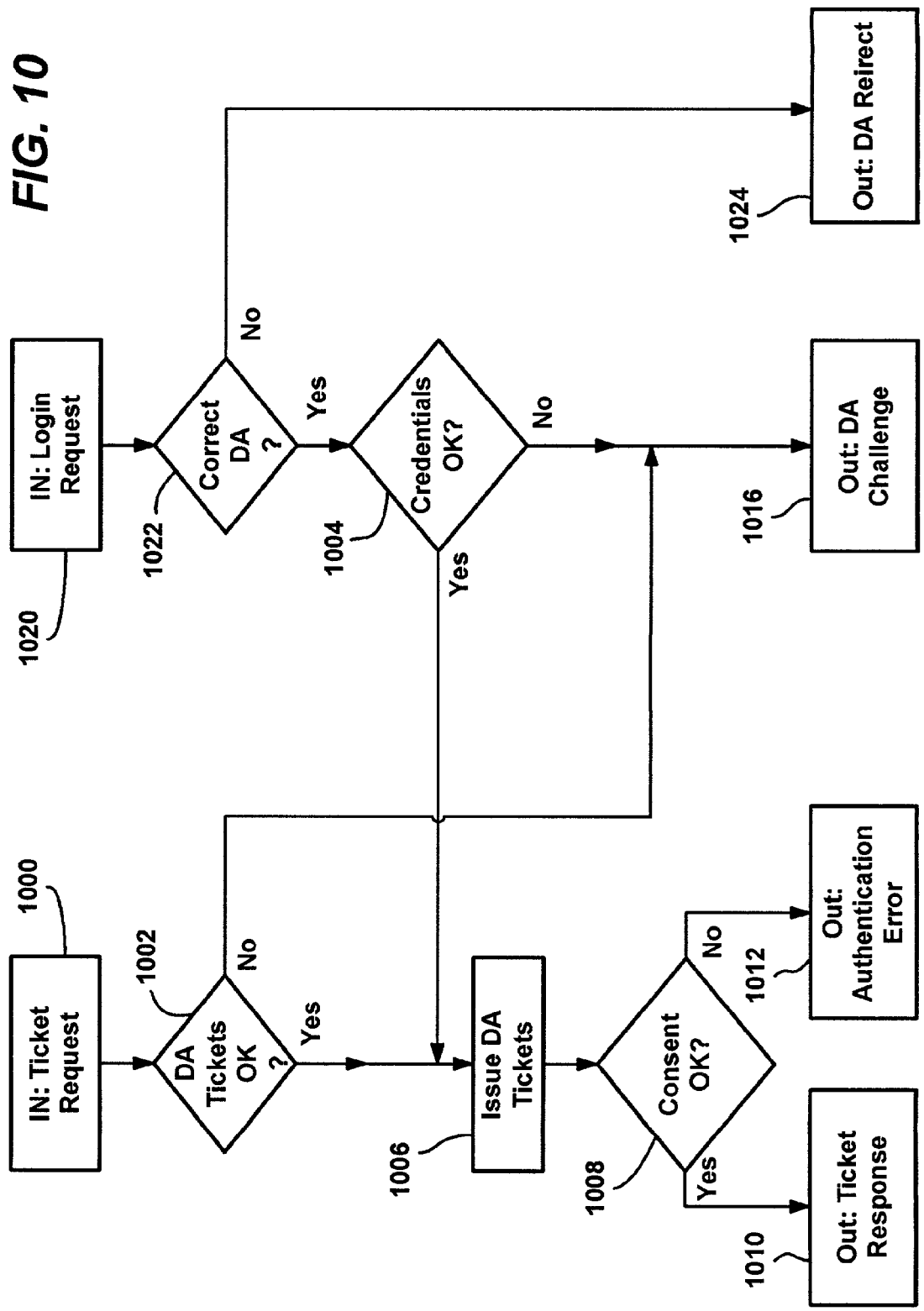

METHOD AND SYSTEM OF INTEGRATING THIRD PARTY AUTHENTICATION INTO INTERNET BROWSER CODE

FIELD OF THE INVENTION

The invention relates generally to computer systems, and more particularly to computer systems and the Internet.

BACKGROUND OF THE INVENTION

Many web sites are secure, at least in part, requiring users to provide an identity and a password to access some or all of the services of that site, including services exposing personal data retrieved for that particular user. An online service such as Microsoft® .NET Passport enables a user to use an existing username (e.g., e-mail address) and a single password to securely sign in to any participating web site or service. In this manner, a user can securely sign in to a number of different web sites once, without needing to remember a different sign-in name and password at every web site, or repeatedly provide the same one in a browsing session.

More particularly, once the user signs in to a participating site, (e.g., www.participatingcompany.com), the site redirects the user to the .NET Passport site, which provides a form page through which a user provides credentials. If validated, the .NET site provides the user with a cookie (e.g., ticket) and automatically redirects the user to the site that was first accessed or other appropriate site or page therein, e.g., a page for that user.

Once a user is signed in to a site, information (e.g., one or more cookies) is saved on the user's computer so that the user need not again provide credentials for any other participating site during that session. If the user elects to save the cookie as a persistent cookie on the computer, (in contrast to a session cookie that is removed when the browser instance is closed), the credential validation is thereafter transparent to the user when accessing the Internet from that computer.

The Passport service was created as a single-sign on authentication service based on web forms and redirect capabilities of HTTP (HyperText Transfer protocol), i.e., the 302 response code, which indicates to browser code that a request should be automatically redirected to another location, in this case, the Passport authentication page. To this end, the HTTP 302 response is sent by the participating partner's server, including a header that indicates a Passport login server to which the request should be redirected. Since established browser functionality reissues a new request to the new location, when the browser code receives a 302 response, the request is automatically redirected. In this manner, the Passport login server presents the web-form based user interface through which the username and password is entered. When the credentials are valid, the login server responds with another 302 redirect, this time to an appropriate page on the site, (e.g., www.participatingcompany.com\WelcomeValidUser.htm or www.participatingcompany.com\YourAccount.asp).

While the above system is simple and functional, it suffers from technical limitations. For example, many new security enhancements and capabilities are built into contemporary operating systems or otherwise performed locally, including the ability to use different authentication protocols, (e.g., Kerberos, NTLM, Basic, Digest and so forth). While use of such local security features for obtaining authentication information is desirable, (as among other reasons, doing so generally provides relatively more security), using such local security was heretofore virtually impossible to implement without causing other problems. For example, to implement local-based authentication using existing HTTP mechanisms, not only would every participating server have to change the type of response sent when authentication was required, but every user's computer would have to be updated to handle the new type of response, which is not realistically possible.

SUMMARY OF THE INVENTION

Briefly, the present invention provides a method and system that enables participating web servers, when properly configured, to automatically use a client's local system-based authentication mechanism for systems with a browser finite state machine (FSM) code that is capable of recognizing a response requesting local authentication. For (legacy) browser FSM code that is not capable of handling the new type of authentication, the existing redirect/page-based authentication mechanism is automatically used. This is possible because the response's authentication request is transparent to legacy browser FSM code, such that the browser FSM code is not broken by the new type of response, yet is recognized by updated browser FSM code. At the same time, servers that are not (yet) configured to provide the new local system-based authentication requests will be able to continue to use the existing redirect/page-based authentication mechanism, with both updated and legacy browser FSM code.

To this end, the present invention enables servers to augment a conventional HTTP 302 redirect response or the like with new authentication-related data requesting local authentication and identifying a particular authentication scheme to use. Legacy browser FSM code reacts to the HTTP 302 redirect response without interpreting the augmented data, thereby acting as before to redirect the user to an authentication site and page. However, updated browser FSM code detects the new authentication-related data, and acts to obtain the authentication credentials locally and use the server-specified scheme, via the appropriate local authentication mechanism.

More particularly, in one implementation, a 302 redirect response may have added thereto an HTTP 401 response-style data. In an HTTP 401-style authentication challenge, the 401 response header indicates a desired authentication protocol. Updated browser FSM code (e.g., in the Wininet/Winhttp component) responds to an HTTP 401 response challenge by invoking the operating system's security subsystem if appropriate (e.g., for NTLM and Kerberos), or by invoking other internal code for protocols (such as Basic) that do not have built-in handlers in the operating system's security subsystem.

As a result, a participating site may issue an HTTP 302 response that includes both the redirect header used by legacy browser FSM code to redirect and invoke web form-based authentication, and the new authentication header data. Updated browser FSM code will recognize and use the new authentication header data to invoke standard (e.g., 401-style) authentication handling. As a result, clients with legacy browser FSM code will continue to work as before, but updated clients and servers will seamlessly upgrade to use the more advanced security subsystem with a specified authentication protocol.

Other benefits and advantages will become apparent from the following detailed description when taken in conjunction with the drawings, in which:

BRIEF DESCRIPTION OF THE DRAWINGS

FIGS. 7A–7C comprise a flow diagram generally representing communication between a client and a server in accordance with an aspect of the present invention;

FIG. 8 is a flow diagram generally representing steps taken by a server to respond to client requests;

FIG. 10 is a flow diagram generally representing steps taken by a third party login server to respond to client requests in accordance with an aspect of the present invention;

DETAILED DESCRIPTION

Exemplary Operating Environment

Figure 1:
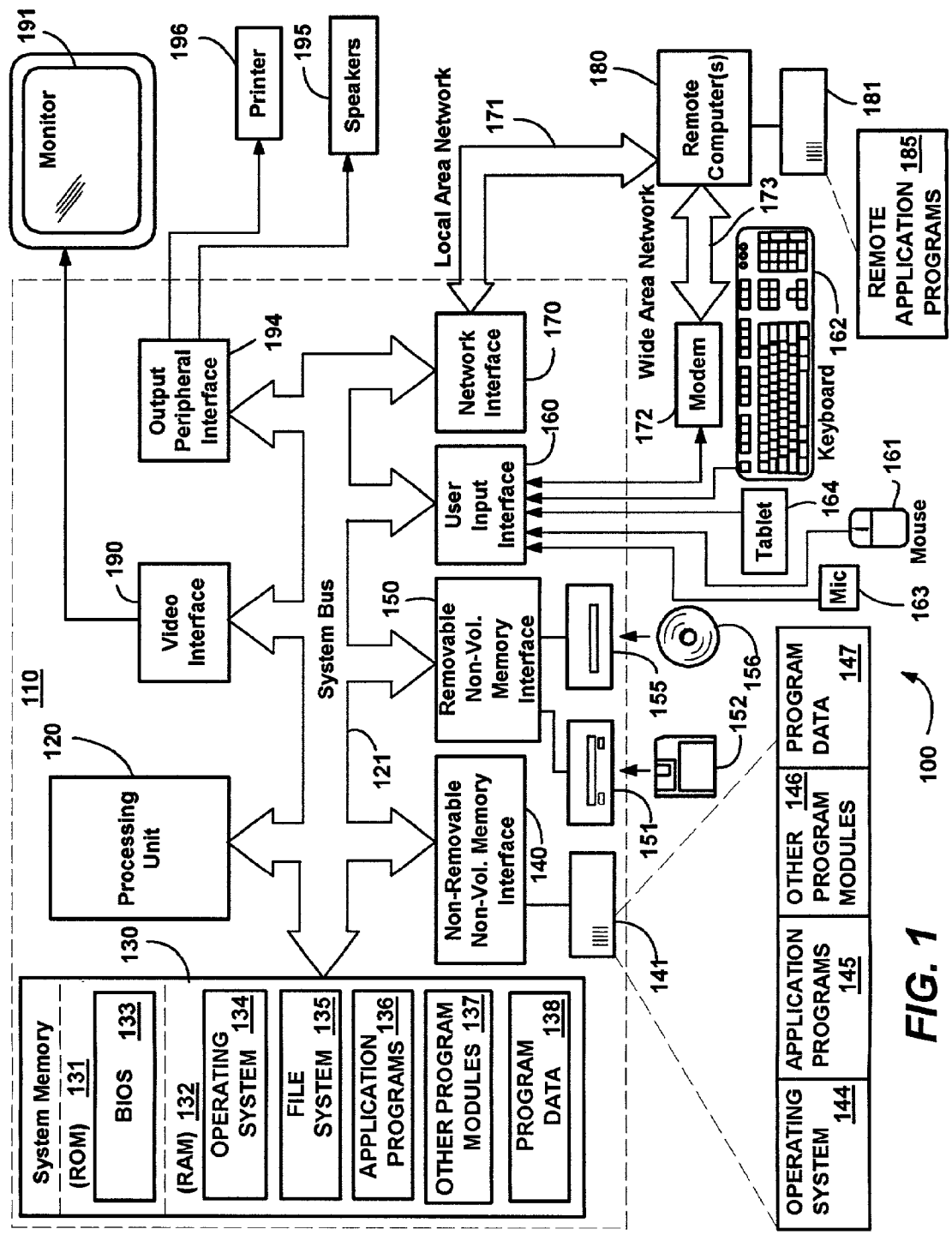
FIG. 1 is a block diagram generally representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Supporting Multiple Authentication Mechanisms

Various aspects of the present invention are generally directed to Internet response handling, and thus the present invention is described with respect to HTTP responses. Further, other aspects of the present invention are described in a Microsoft Windows® XP operating system environment, in which the browser code and some of the local authentication mechanisms are incorporated into the operating system. Moreover, other aspects of the present invention are described with respect to the Microsoft® Passport service, a third party authentication service that facilitates the online authentication of users to participating web sites. Nevertheless, as will be readily appreciated, the present invention is not limited to any particular protocol, operating system, browser code and/or online authentication service, but rather is applicable to numerous alternatives in computing, including those such as new transfer protocols not yet implemented.

Figure 2:
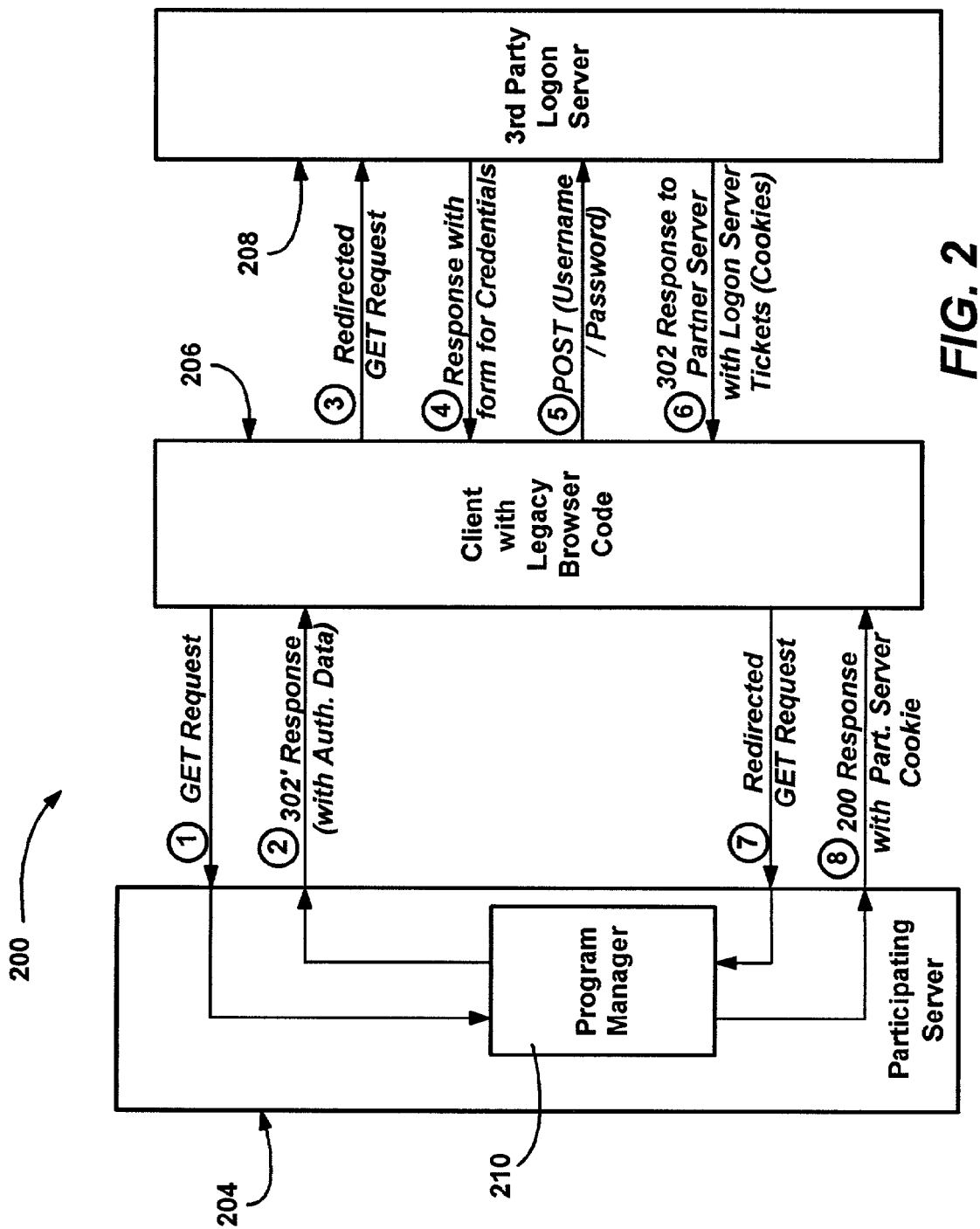
FIG. 2 is a block diagram generally representing the flow of information between networked computers when a client with legacy browser FSM code receives an HTTP 302 response that includes authentication data in accordance with an aspect of the present invention.

Turning to FIG. 2 of the drawings, there is represented a network 200 of computers arranged for use with a third party authentication service (e.g., Microsoft® .NET Passport, or simply Passport), including a participating server 204, a client computer 206, and a third party login server 208. By participating server, (alternatively referred to as a partner server), it is generally meant herein to refer to the entity (e.g., organization or person) having a site account that makes use of the third party authentication service. The login server 208 refers to a server of the trusted third party authentication service or the hierarchy of services that stores and administers member and site accounts, (e.g., Passport). As is apparent, FIG. 2 is generally simplified, as in an actual implementation, there is typically a domain name servers (DNS) and millions of other computers to which the client computer 206 can communicate.

A user, or member, is the entity (e.g., real person) having a third party authentication service member account that, via the client computer 206, accesses participating servers using credentials comprising a username and password. In general, the client refers to the combination of software used by a user to communicate with the other servers and provide information thereto. A typical client comprises a client program such as an application program or browser user interface, that consumes content and/or other data that the third party authentication service protects. A client also includes lower-level browser finite state machine (FSM) code, represented as the component 408 of FIG. 4, (e.g., Wininet.dll or Winhttp.dll), that interfaces to the Internet via an HTTP transport layer, and handles third party authentication service authentication tickets, and presents an application programming interface to client applications. As used herein, the term client will be used as either an application program or browser user interface, the browser FSM, or a combination thereof. Further, a "ticket" or "tickets" refers to at least one cookie or other suitable file that carries a third party authentication service's ticket or profile.

One implementation of the present invention uses an HTTP-level protocol, referred to as SSI, for carrying a third party authentication service's authentication information as described below. Although there are different versions of the SSI protocol, the present invention is directed to those versions which carry additional authentication information in a header. As will become apparent, the information communicated according to the protocol is used differently depending on the capabilities of the client browser FSM.

FIG. 2 represents a general flow of communication between the computers 204, 206 and 208, wherein the participating server 204 has been configured to execute a program manager 210. As represented in FIG. 2 by the arrow labeled one (1), the client 206 seeking access to a participating site essentially sends an HTTP GET request to the participating server 204. The participating server 204, configured in accordance with an aspect of the present invention, responds with an appropriate HTTP response, as represented by the arrow labeled two (2).

More particularly, if the server 204 wants third party authentication, and has not been told by the client that the client can handle a direct authentication request, the program manager 210 returns an HTTP 302 (redirect) response. In keeping with the present invention, as described below, the 302 response is augmented with additional authentication-related data in a header field, which will be referred to with reference to FIGS. 2 and 3 as an HTTP 302' response. In general, the 302' response includes the additional authentication data in a header thereof, and the authentication data is like that sent in an HTTP 401-style response. In the example of FIG. 2, the legacy browser code is not able to handle a direct authentication request, and thus the server 204 returns the HTTP 302' response.

In accordance with one aspect of the present invention, the client browser code treats the HTTP 302' response as an ordinary HTTP 302 response, because the client browser code does not recognize or otherwise act on the additional data in the header. As a result, authentication occurs as before, i.e., by redirection to a third party login server 208 identified in the HTTP 302' response, (shown in FIG. 2 via the arrow labeled three (3)). In turn, unless the client provides cached credentials to the third party login server 208, the third party login server 208 returns a response including a form for credential entry (the arrow labeled four (4)). The client 206 sends the credentials, and if valid, the third party login server 208 returns login server tickets/cookies (the arrows labeled five (5) and six (6)) in an HTTP 302 response redirecting the client to the originally requested (or other suitably appropriate site), as represented by the arrow labeled seven (7). With the login server tickets, the client now gets access to the requested site, and the server returns content in an HTTP 200 response with its own cookie or cookies, as represented by the arrow labeled eight (8). In this manner, a legacy client works as before to obtain access to a third-party authentication service protected site.

Figure 3:
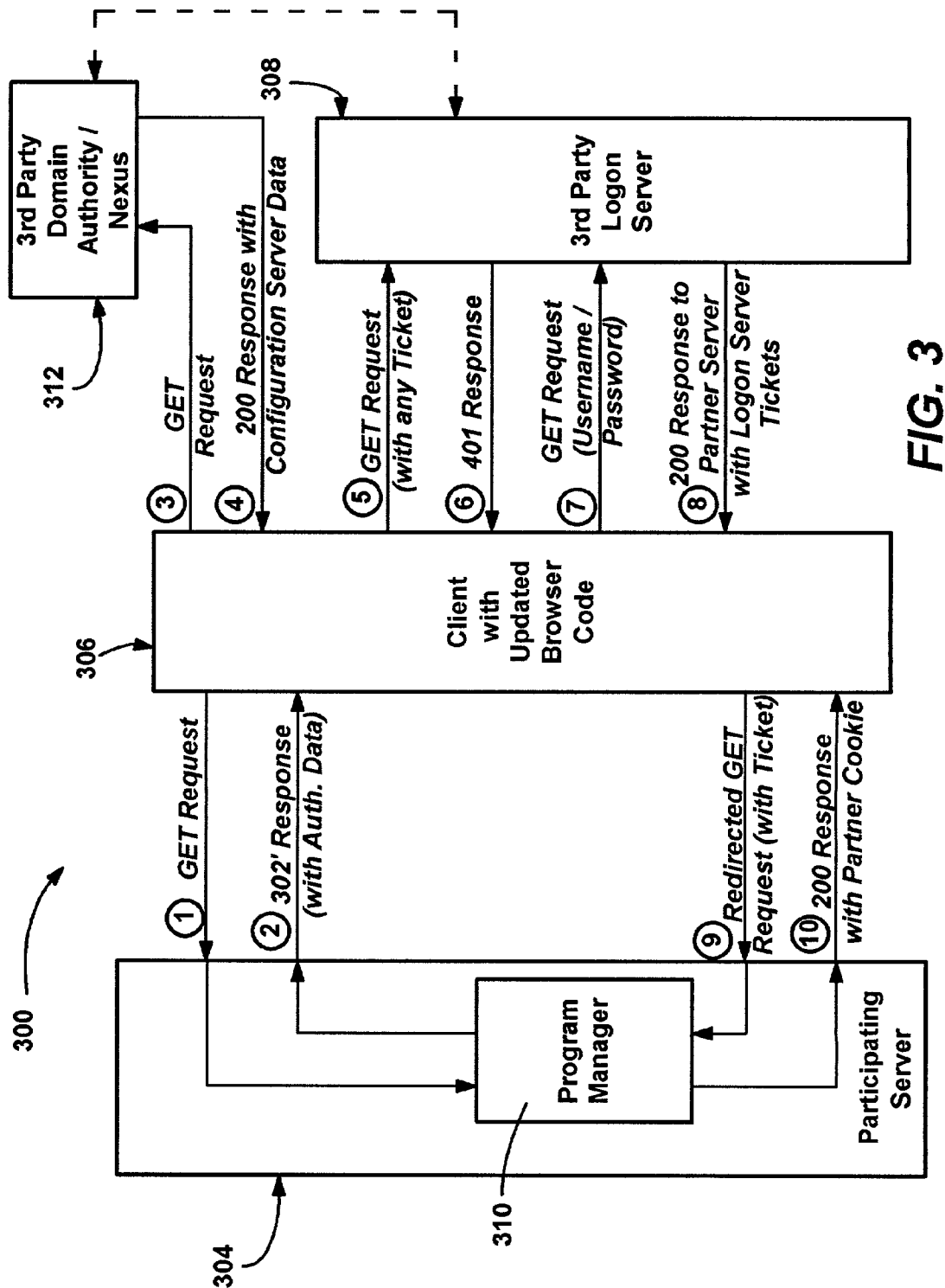
FIG. 3 is a block diagram generally representing the flow of information between networked computers when a client with updated browser FSM code receives an HTTP 302 response that includes authentication data in accordance with an aspect of the present invention.
Figure 4:
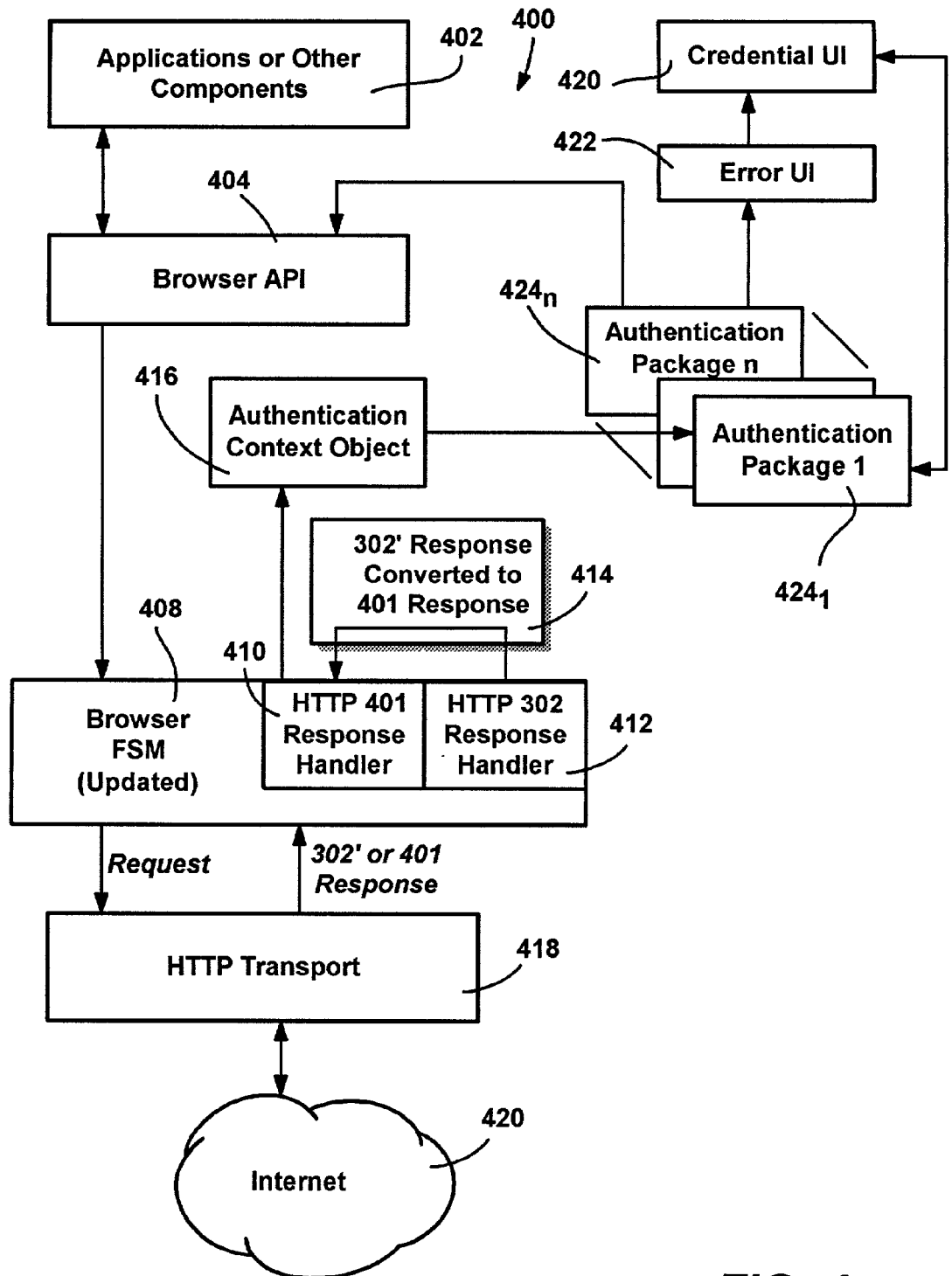
FIG. 4 is a block diagram generally representing example components in which the present invention may be implemented including updated browser FSM code, in accordance with an aspect of the present invention.

In accordance with another aspect of the present invention as generally represented in FIG. 3, a client with updated browser code is configured to interpret and handle the extra information present in the HTTP 302' response in order to use one of its local authentication mechanisms. FIG. 3 and FIG. 4 generally represent how this works, wherein FIG. 3 shows the flow of communication between the client and servers, while FIG. 4 shows the components that handle the HTTP 302' request. Note that as used herein, "local" does not necessarily mean always residing on the machine, as something local can be executed on another resource as if local or loaded from another resource on demand.

FIG. 3 shows the general flow of communication in a network 300 between a client 306, participating server 604, third party domain authority nexus server and third party login server 308. In FIG. 3, a domain authority generally defines an organization that is part of a third party authentication service, and administers a given subset of the member accounts and/or a given subset of the site accounts. The network 300 thus includes the collection of users/members, participating servers, and at least one third party authentication service domain authority. Each domain authority 312 has a login server 308 that represents the domain authority that in the SSI protocol, e.g., login.Passport.com, and also a nexus server that provides information describing the topography of the third party authentication service's network, including the distribution of the member (and site) accounts among several domain authorities, the URLs of particular resources in each domain authority, and so forth.

When the client 306 requests a resource on a server 304, e.g., the GET request (the arrow labeled one (1) in FIG. 3, the program manager in the server 310 determines whether the request requires third party authentication. If so, the server checks the request for the presence of tickets. If a valid ticket is sent with the request, the server 304 responds with the requested resource. If a valid ticket was not sent by the client, the server responds with a 302 status code (e.g., the arrow labeled two (2) in FIG. 3).

For example, in one implementation, the response includes the challenge header, "WWW-Authenticate: Passport 1.4" (or later version). As described above, clients that are not updated follow the redirection to the third party authentication service login server 308. Updated clients recognize the challenge header information, and typically contact the domain authority's nexus server 312 to determine the login server 308, represented in FIG. 3 via the arrows labeled three (3) and four (4).

The client then communicates with the third party authentication service's login server 308, which handles requests for tickets for any resource in the domain authority. Before a request can be authenticated by the third party authentication service, the client 306 contacts the login server 308 to obtain the appropriate tickets, e.g., the arrow labeled five (5) in FIG. 3.

When a client 306 requests tickets from the login server 308, the login server 308 typically responds with an HTTP 401 status code to indicate that user credentials need to be provided (e.g., the arrow labeled six (6)). Upon the provision of these credentials, the login server 308 responds with the tickets required to access the server containing the originally requested resource. This is represented in FIG. 3 via the arrows labeled seven (7) and eight (8). The login server 308 can also redirect the client to another server that can provide the requested resource.

When the client has the tickets corresponding to a given server, those tickets are included with future requests to that server, such as in the redirected GET request represented in FIG. 3 by the arrow labeled nine (9). If the tickets have not been modified since they were retrieved from the login server 308, and the tickets are valid for the resource server 304, the resource server 304 sends a response (e.g., the arrow labeled ten (10)) that includes both the requested resource and cookies indicating that the user is authenticated for future requests. The additional cookies in the response are intended to speed the authentication process, in that additional requests (in the same session) for resources on servers in the same third party authentication service will include these additional cookies. As a result, credentials do not need to be sent to the login server again until the cookies expire, which may be per session or persisted for multiple sessions.

FIG. 4 explains the components in the client that initiate and handle requests, and handle the responses. In general, applications (or other components) 402 call through browser APIs 404 to the browser FSM 408 (e.g., Wininet/Winhttp). The browser FSM 408 comprises a component that provides API support for sending and receiving HTTP requests via an HTTP transport 418 to the Internet or other network (e.g., Intranet) 418. Features built into the browser FSM 408 include the ability to process HTTP response codes and response headers, and provide some automatic handling of various responses on behalf of the caller. Among the responses that can be handled automatically are HTTP 302 redirects and HTTP 401 authentication challenges, via HTTP 401 response handler code 410 and HTTP 302 response handler code 412.

When calling program code wishes to send an HTTP request (e.g. a GET request to retrieve a web page from a web server), it will call one of Browser FSM's APIs, (e.g., a SendRequest API). The browser FSM 408 will properly format the request and send it via network technology, such as provided by the Winsock component of a Windows® operating system, to the target server. When the server responds, the browser FSM 408 parses the response based on the HTTP protocol, and implements logic to proceed appropriately.

If the response is a conventional HTTP 302 redirect, the browser FSM 408 parses the headers for the location to which the request is being redirected, and generates a new HTTP request targeting the new location. If the response is an HTTP 401 authentication challenge, the browser FSM 408 parses the headers for the authentication schemes (e.g., Kerberos) specified by the server. For example, these are identified by the keyword "WWW-Authenticate" in the header, with the scheme following the keyword. Based on the specified scheme, the browser FSM 408 will instantiate an authentication context object 416, and pass it the information from the 401 response. This context object implements the appropriate authentication logic.

The following table includes authentication schemes that are supported by Wininet/Winhttp, the authentication type, and a description of the scheme.

| Scheme | Type | Description |
| --- | --- | --- |
| Basic (cleartext) | basic | Uses a base64 encoded string that contains the user name and password. |
| Digest | Challenge-response | Challenges using a nonce (a server-specified data string) value. A valid response contains a checksum of the user name, the password, the given nonce value, the HTTP verb, and the requested Uniform Resource Identifier (URI). |
| NTLM | Challenge-response | Requires the authentication data to be transformed with the user credential to prove identity. For NTLM authentication to function correctly, several exchanges take place on the same connection. Therefore, NTLM authentication cannot be used if an intervening proxy does not support keep-alive connections. NTLM authentication also fails if Wininet/WinhttpSetOption is used with the WININET/WINHTTP_DISABLE_KEEP_ALIVE flag to disable keep-alive semantics. |
| Passport | Challenge-response | Uses Microsoft Passport 1.4 or greater. |
| Negotiate | Challenge-response | If both the server and client are using Windows® 2000 or later, Kerberos authentication is used. Otherwise NTLM authentication is used. Kerberos is new in Windows® 2000 and is considered to be more secure than NTLM authentication. For Negotiate authentication to function correctly, several exchanges take place on the same connection. Therefore, Negotiate authentication cannot be used if an intervening proxy does not support keep-alive connections. Negotiate authentication will also fail if Wininet SetOption is used with the WININET/WINHTTP_DISABLE_KEEP_ALIVE flag to disable keep-alive semantics. The Negotiate authentication scheme is sometimes called Integrated Windows® authentication. |

For authentication schemes supported by the security mechanisms integrated into the operating system, the context object 416 makes the appropriate calls into an authentication package, such as one provided in the operating system's security subsystem (e.g. AcquireCredentialsHandle, IntitializeSecurityContext, and so forth) and formats the challenge response based on data returned from those calls. For schemes not supported by integrated operating system security, the context object 416 formats the challenge response itself. Once the challenge response is built, the browser FSM 408 resubmits the original HTTP request, with the response added as an authentication header.

In accordance with an aspect of the present invention, an updated browser FSM 408 handles HTTP 302 redirect responses in a new manner. More particularly, when the browser FSM 408 receives a 302 response, the browser FSM 408 first checks for the presence of a 401-style authentication challenge header, as specified according to the third party authentication service's SSI protocol. For example, in a Passport network, this data is indicated by a header in the HTTP 302' response that begins with "WWW-Authenticate: Passport 1.4" (or greater version number).

If the 401-style authentication challenge header is present, then the browser FSM 408 via its HTTP 302 handling code (block 412) attempts to convert the HTTP 302' response into an HTTP 401 response, represented in FIG. 4 as the block 414. Then, the HTTP 401 handling code (block 410) that is normally called when the browser FSM 408 detects a 401 response is called, and that code 410 (known as AuthOnResponse) will create a third party authentication service (e.g., Passport) authentication context object as the object 416, as if a conventional HTTP 401 authentication response had been received. At this point, the context object 416 proceeds as it normally would, and from the caller's standpoint, there has been an HTTP 401 response. For example, if user interface is required to obtain the credentials, the normal process for invoking authentication dialogs occur, and so forth.

Figure 5:
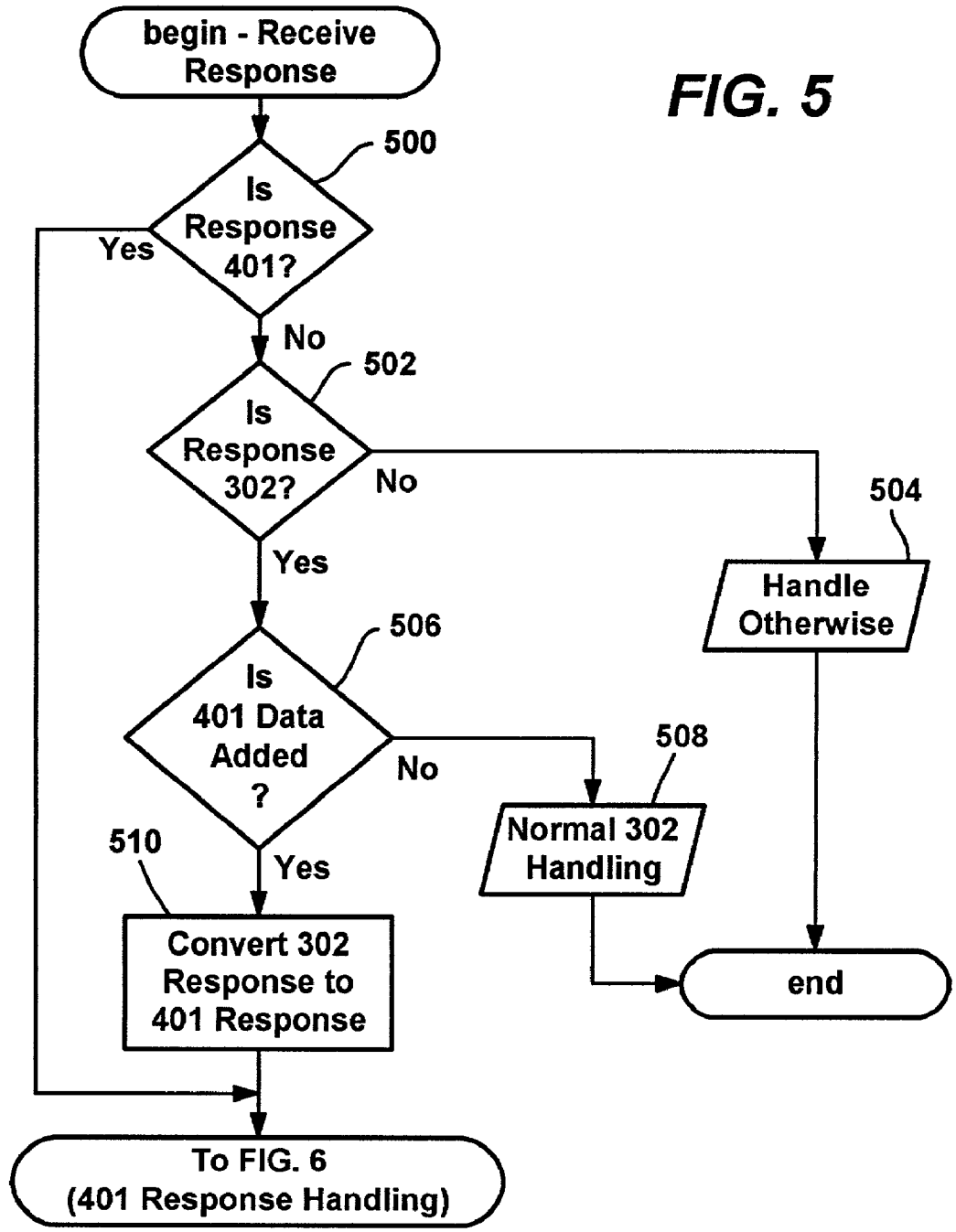
FIGS. 5 and 6 comprise a flow diagram generally representing example steps taken in an updated browser when processing an HTTP 302 response that includes authentication data, in accordance with an aspect of the present invention.
Figure 6:
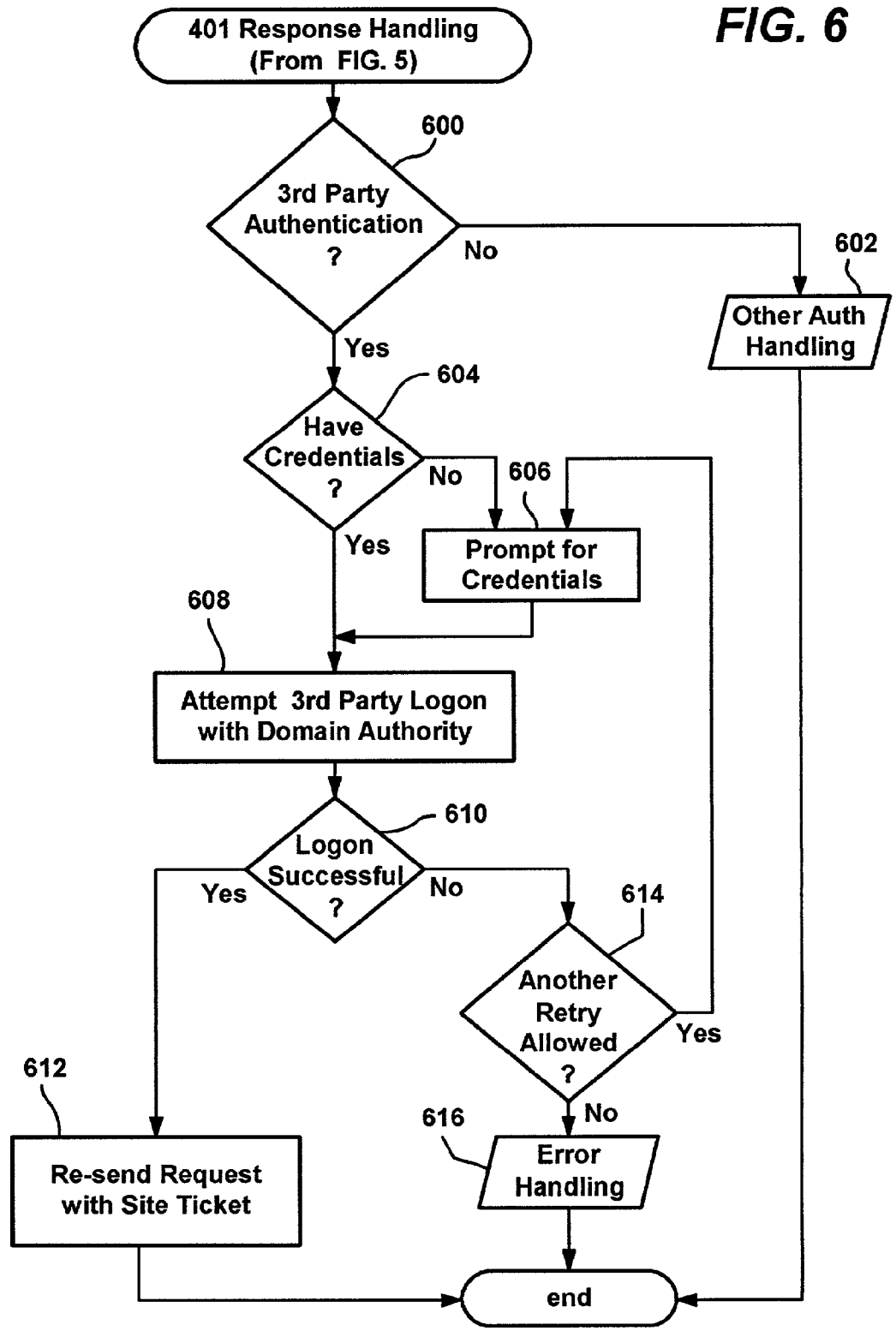

Turning to an explanation of the operation of the present invention, FIGS. 5 and 6 show the general logic that an example updated browser FSM 408 may perform when a response is received. As represented at step 500 of FIG. 5, an incoming response is evaluated to determine whether it is an HTTP 401 response, and if so, step 500 branches to step 600 of FIG. 6, described below. If not an HTTP 401 response, at step 502, the incoming response is evaluated to determine whether it is an HTTP 302 response. If not, the process handles the response accordingly, as represented by step 504. Note that the steps in FIGS. 5 and 6 are only an example to emphasize HTTP 401 and HTTP 302 response handling, and thus more efficient ways of handling responses, e.g., that do not first check every response first for whether it is an HTTP 401 or HTTP 302 response, will ordinarily be implemented.

In accordance with one aspect of the present invention, if the response is an HTTP 302 response, step 506 evaluates the response header for the 401 authentication-style data. If not present, the response is handled as a normal HTTP 302 response at step 508. In this way, ordinary redirect requests are handled as before, including redirect requests for Passport authentication from any servers that have not yet been configured to request the updated type of local-based authentication.

If the 401 authentication-style data is present in the header as detected by step 506, step 506 branches to step 510 where the HTTP 302 response is essentially converted to an HTTP 401 response. The process then continues to step 600 of FIG. 6 to handle the HTTP 401 response.

Step 600 determines whether the HTTP 401 response is directed to third party (e.g., Passport) authentication based on the data therein. If not, step 600 branches to step 602 where other authentication code processes the HTTP 401 response. If the HTTP 401 response data indicates that the response is directed to authentication by the appropriate third party, then step 604 is executed to determine whether the user credentials already exist in storage, e.g., maintained as one or more cookies. If so, step 604 continues to step 608 so as to attempt to use those credentials without interrupting the user, otherwise the credentials are needed, whereby step 604 branches to step 606 to prompt the user for them. In one implementation, the credentials comprise a username and password, and the credential user interface 420 is invoked to obtain one or both of these items.

With the credentials, step 608 is performed to attempt the third party login, with the domain authority 312. If successful, as evaluated at step 610, the process branches to step 612 to resend the ticket to the server that originally responded with either the HTTP 302 or HTTP 401 request, as represented by step 612. If not successful, step 610 branches to step 614 to determine whether another retry attempt is allowed, e.g., there may be a limit for security reasons that only allows three login attempts. If retries are allowed, the process returns to step 606 to prompt for user credentials, to again attempt the login at step 608. Note that the login server may keep a retry count or the like, but should distinguish between stored credentials that were initially sent versus those that were entered via a prompt, so that, for example, a user gets the same number of (e.g., three) attempts at manual credential entry, regardless of whether existing credentials existed but failed, or did not exist. If no more retries are allowed, step 616 represents the error handling, such as by presenting an error user interface 422 visible within the credential user interface 420.

The following describes an example scenario wherein a user clicks on a sign-in button, presented on a participating server's website, of the third party authentication service. For this example, the participating server has the internet domain "partnerserver.com," and the third-party authentication service is the "Passport" authentication service. The sign-in button has script that invokes a navigate to http://www.partnerserver.com/YourAccount.htm, which when executed results in a call to the browser FSM 408. The call causes the browser FSM 408 to issue an HTTP GET request for www.partnerserver.com/DoPassport.asp. This page is protected by a Passport authentication according to the SSI protocol version 1.4 or greater, whereby it responds to the GET request with a 302 status redirecting to https://login1.Passport.com/loginpage.asp. In keeping with the present invention, the response also includes a header with "WWW-Authenticate: Passport 1.4" (or greater version number).

If a legacy version of the legacy browser FSM is being used, it will reissue a new GET request for https://login1.Passport.com/loginpage.asp. This request should, assuming normal network connectivity, return an HTTP 200 Status OK response, along with a page that includes a login form where the user can type in his username and password. In this case, the "WWW-Authenticate: Passport 1.4" header is ignored, and legacy Passport authentication will continue, because that is what the client is capable of handling. If authentication is successful, the Passport login server will return another 302 status, this time redirecting to the correct (e.g., "successful login") page on the original participating server, such as http://www.partnerserver.com/YourAccount.asp. The legacy browser FSM will follow the redirect, and issue a third GET for this new page, which should return a 200 Status OK result, and the legacy Browser FSM will hand this back to the caller (e.g., the browser control/renderer, such as Internet Explorer) which will display the final page.

If an updated version of the browser FSM 408 receives the above response, it will recognize the "WWW-Authenticate: Passport 1.4" (or greater) header, essentially convert the HTTP 302 response to an HTTP 401 response, and thereby instantiate a Passport authentication context object 416. This object 416 will perform updated Passport authentication, including making use of a local credential manager (e.g., in the package $424_1$) and a standard credential user interface 420 built into the system. As described below, the authentication context object will initiate an out-of-band conversation with Passport login servers, and, if the user's credentials are valid, return success. Returned along with the result validating the user's credentials will be the correct redirect page to show to the user, which, in this example, is http://www.partnerserver.com/YourAccount.asp. When received, the browser FSM 408 issues a GET request to this page, and upon a successful response, returns it to the caller for display.

SSI Protocol for Carrying Authentication Information

Updated versions of the SSI protocol aim to centralize the handling of third party authentication service in the one client browser FSM component (Wininet/Winhttp), so that client applications and the like have a uniform application programming interface for third party authentication service that abstracts the protocol details. This way, the user experience and programming experience across different applications will be the same. Upgrades to the protocol will only require an upgrade to the client browser FSM. Clients that that display third party authentication service user interface will appear the same and act consistently.

One important aspect is that the invocation of local security mechanisms enables the usage of a much stronger, standards-based protocol. Another benefit provided by the updated protocols is the connection of two previously disconnected actions, redirection and authentication. This facilitates the interoperability of HTTP based clients and servers, or, in the future, HTTP based network peers. For example, in the third party authentication service, the present invention used connection to bridge the gap from an old authentication protocol to new ones. As can be readily appreciated, other scenarios may benefit this combination of redirection and authentication concepts.

In general, as described above, SSI 1.4 the protocol involves a number of interrelated components, including the browser FSM 408, the program manager component 310 running on the participating, server and the SSI protocol-aware Login server 308. In general, the browser FSM 408 stores third party authentication tickets and presents them to third party participating sites, implements functions (e.g., in an application programming interface) through which client applications can become aware of and control third party authentication, implements functions through which client applications can collect and/or supply user credentials, and implements the current functions that deal with the updated SSI protocol versions.

The authentication exchange between the client and the server resembles the exchange in any other HTTP authentication mechanism in that the client requests content of a URL, and the server responds with authentication parameters that indicate that the URL requires third party authentication. The client obtains tickets that will be acceptable to the server, typically by contacting a third party login server, and tries the request again. If authentication fails, the server returns a failure and restates that third party authentication is required. If auth succeeds, the server responds with further parameters (e.g., its cookies) and the authenticated content.

As in HTTP authentication, the client reuses successful tickets in future requests without waiting for a challenge from the server. The client may also choose to forget successful tickets at any time. Unlike the traditional HTTP framework, the server may instruct the client to forget tickets it may have previously collected, in which event the client is required to forget the tickets.

Figure 7A:
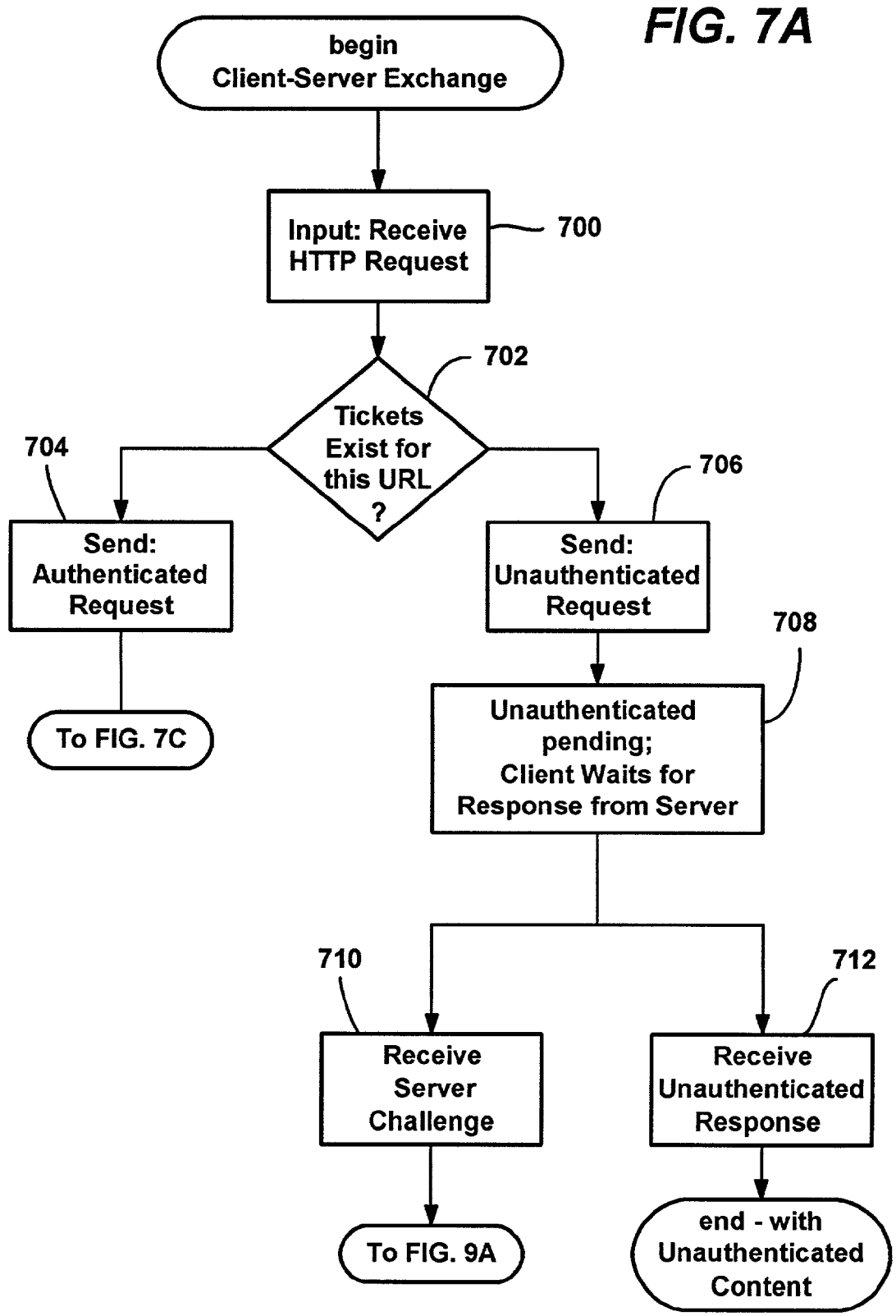
Figure 7B:
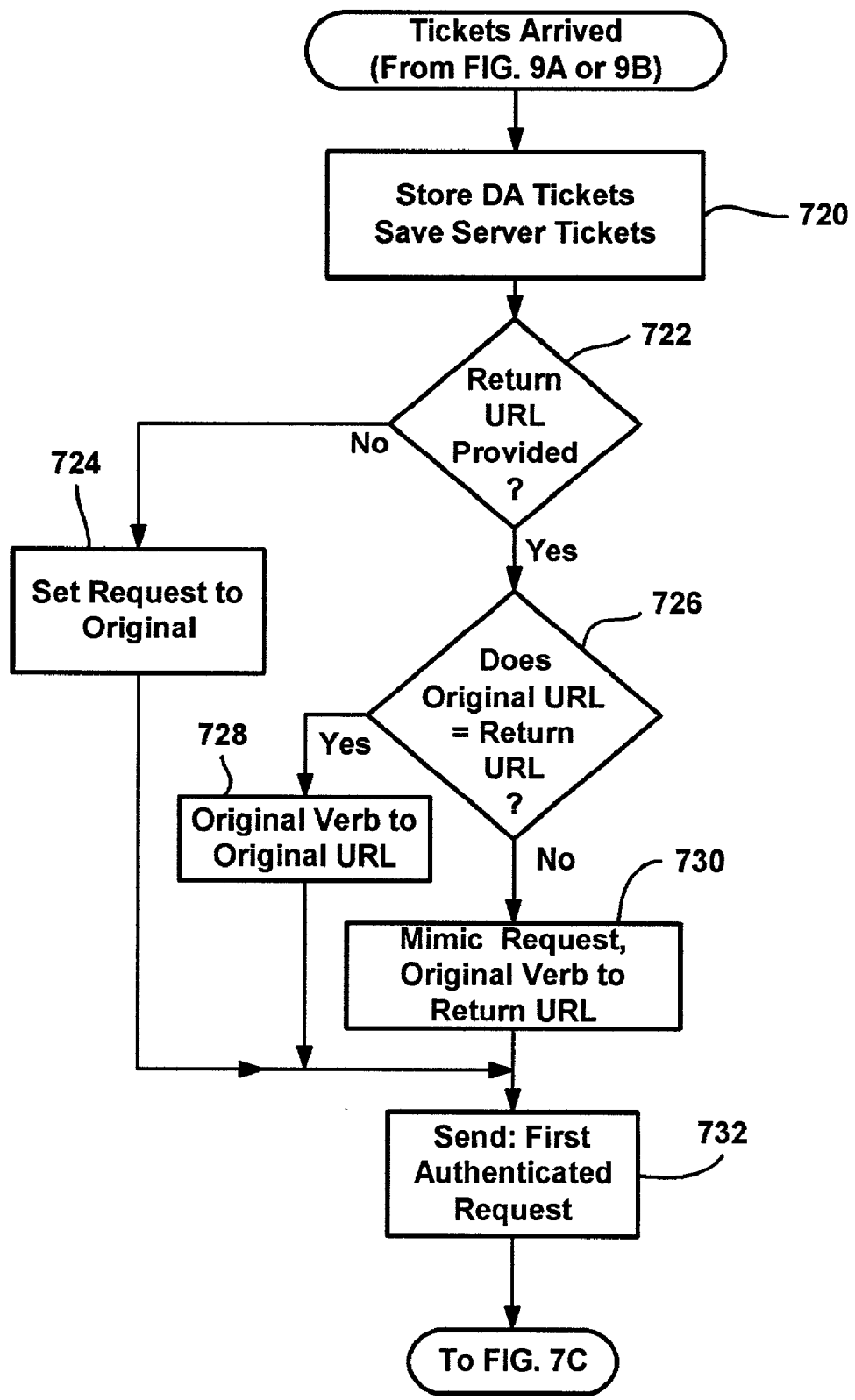

FIGS. 7A–7C generally show the communication between the client and server from the client's perspective. As generally represented in FIG. 7A, the client provides a URL in an HTTP request at step 700. At step 702, if the client has tickets that were previously successful for this URL, the client sends those tickets without waiting for a challenge from the server, in an authenticated request at step 704, and the process continues to step 740 of FIG. 7C to await authentication. If the client does not have tickets for this URL, the client sends an unauthenticated request at step 706, and awaits the response at step 708.

Figure 9A:
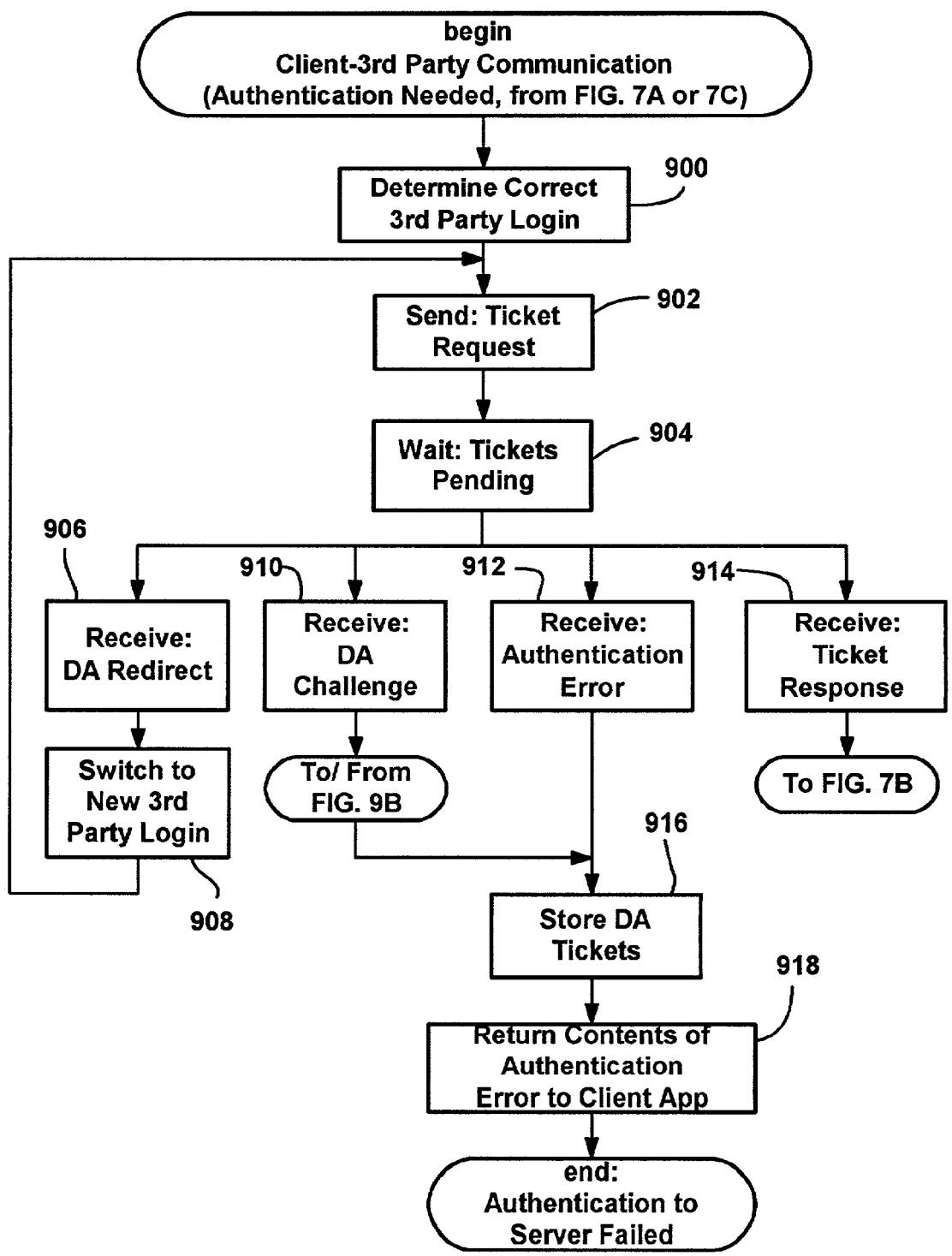
FIGS. 9A–9B comprise a flow diagram generally representing communication between a client and a third party authentication server in accordance with an aspect of the present invention.

When the client sends the unauthenticated request, the client receives either a server challenge, as represented by step 712, in which event the client process branches to step 900 of FIG. 9A, or the client receives an unauthenticated response, with unauthenticated content, as represented by step 714. In this manner, non-participating servers serve content as before, while participating servers can selectively choose to serve unauthenticated content, such as depending on the URL. Note that as used herein, authenticated versus unauthenticated refers to authentication by the third party service, not other types of authentication.

In general, there are three different messages that the client sends to the server, namely "first authenticated request", "authenticated request" and "unauthenticated request" messages. An unauthenticated HTTP request to a resource is a request that does not contain any third party authentication service authentication information. Any HTTP request may be an unauthenticated request. For example, an initial request from a browser client may look like the following:

GET /pub/WWW/TheProject.html HTTP/1.1
   Host: www.w3.org while an initial request from a DAV client may look like the following:

PROPFIND /file HTTP/1.1
   Host: www.foo.bar
   Content-type: text/xml; charset="utf-8"
   Content-Length: xxxx
   <?xml version="1.0" encoding="utf-8" ?>
   <D:propfind xmlns:D="DAV:">
      <D:prop xmlns:R="http://www.foo.bar/boxchema/">
         <R:bigbox/>
         <R:author/>
         <R:DingALing/>
         <R:Random/>
      </D:prop>
   </D:propfind>

Further, the HTTP 1.1 authentication framework plans to standardize the use of a new request header that the client may use preemptively to advertise the authentication schemes it accepts. This request header is of the following form:

Advertise-Auth="Accept-Auth"":" 1#(auth-scheme)

A client built to this specification may use this header in the unauthenticated request, to advertise to the server of its third party authentication service capabilities. If the client chooses to use Advertise-PP, it should send the header in every exchange with the server and with the Login server. If the client chooses to do so, the Accept-Authentication header is of the following form:

Advertise-PP="Accept-Auth"":" 1#(PPauth-scheme | auth-scheme)

The first authenticated request comprises an HTTP request that contains the third party authentication service tickets given from a third party authentication service login server. The tickets (ticket and profile) are in the "Authorization" request header, as follows:

| | |
|---|---|
| AR-Authorization = | "Authorization" ":" PPauth-scheme first-authenticated-request |
| first-authenticated-request = | from-PP |
| from-PP = | "from-PP" "=" quoted-string | where "PP" generally stands for Passport, and from-PP is taken directly from the Ticket Response in Client-third party authentication service communication. The client is to treat it as opaque.

An authenticated request comprises an HTTP request that contains third party authentication service tickets, which in the SSI 1.0 protocol version are sent as cookies. The individual tickets are treated as cookies while determining if they are applicable to the current URL.

An HTTP authenticated response (or HTTP logout response) is carried in an Authentication-Info response header, as follows:

| | |
|---|---|
| AR-Authentication-Info = | "Authentication-Info" ":" PPauth-scheme auth-status |
| authenticated -status = | "status" = ("success" | "logout") |

Any 1xx, 2xx, or 3xx class HTTP response (e.g., an HTTP 302 response) may be an authenticated response or the logout response, with 'status=success' utilized for an authenticated Response, or 'status=logout" for Logout.

FIG. 8 generally shows a participating server's handling of such client requests (802, 804 or 806) and the server's decision-making process. As represented in FIG. 8, at step 808, after receiving one of the requests, the server initially determines whether the requested URL sent by the client is protected by the third party authentication service, i.e., whether the URL requires third party authentication according to the server's own predetermined criteria. For example, some of the content of a given site, corresponding to a given URL may be protected, while a public visitor's page and other content may not be protected. If third party authentication is not required for a given URL, the server sends an unauthenticated response via step 810. As used herein, an unauthenticated HTTP response is any HTTP response that does not have the third party authentication service's authentication information associated therewith.

If third party authentication is required, step 808 branches to step 812 where the server determines whether tickets exist, and if so, whether they are OK (not invalid). To this end, in a first authenticated Request, the server parses the "from-PP" parameter, while in an authenticated request, the server uses the list of tname parameters in to determine which of the cookies are third party authentication service tickets. The server decides whether the tickets are OK or invalid based on the time the tickets were issued, the types of tickets of tickets that are present or absent, and any other information in the tickets. If the tickets are invalid, the server sends a server challenge via step 814, received at step 710 as described above.

If the tickets are not invalid, the process branches to step 816 where the server determines whether the tickets are directly from a (third party) domain authority login server. Tickets are directly from a domain authority if they came in a first authentication request, (described below). In general, if tickets are from a domain authority, then the client does not know if they are good, and is waiting for the server to set them. In such a situation, the server responds with a Set Tickets response as represented by the branch to step 818. A Set Tickets response is an HTTP response that sets the new tickets that the client has just sent in a first authenticated Request. An authentication information response header is used to deliver this information:

| | |
|---|---|
| CT-Authentication-Info = | "Authentication-Info" ":" PPauth-scheme set-ticket-response |
| set-ticket-response = | 1#(tname | [auth-param]) | where the list of tnames indicates the cookies that are to be treated as Passport tickets. The actual tickets are sent as cookies.

If not directly from the domain authority, the server branches to step 818 to decide whether to instruct the client to forget the tickets it sent, according to some criteria. If so, the server responds with a Logout response at step 820.

Otherwise, the response is authenticated, as represented by step 822. An authenticated response comprises an HTTP response that indicates that the third party authentication service's tickets that came with the request were valid.

Returning to step 710, a server challenge response comprises an HTTP response indicating that the client's request has failed, and describing the third party authentication service tickets needed for access. This challenge is carried in a WWW-Authenticate response header, as set forth in the following table:

| | |
|---|---|
| SC-WWW-Authenticate = | "WWW-Authenticate" ":" PPauth-scheme server-challenge |
| server-challenge = | site "," time [optional-arg-list] |
| optional-arg-list = | "," site-optional-arg optional-arg-list \| "" |
| site-optional-arg = | ([cobrand-URL] | [return] | [cbtxt] | [renew-window] | [force-login] | [kpp-arg] | [server-args-ex]) |
| site = | "site" "=" sid |
| time = | "ct" "=" time-value |
| sid = | positive-int-value |
| srealm = | "domain" "=" host-name |
| cobrand-URL = | "cburl" "=" absoluteURI |
| return = | "ru" "=" absoluteURI |
| cbtxt = | "cbtxt" "=" cobranding-text-string |
| renew-window = | "rtw" "=" time |
| force-login = | "fs" "=" (0 | 1) |
| kpp-arg = | "nKPP" = num |
| server-args-ex = | auth-param |

The meanings of the above directives are as follows:

| | |
|---|---|
| site | This is actually the site's ID. |
| time | Site's current time, necessary for stamping the tickets on the login server side. |
| ru: | The (Return) URL where the client is to return after successful authentication. If provided, the initial request will be overridden with a GET to this URL. Participating servers will typically use this directive to control the user flow after authentication. |
| cbtxt | Text string used to co-brand the Win32 dialog. If not specified, the DA will use a default one specified in the partner description (e.g., from an XML file). |
| Rtw | The maximum time-window since the last time the client has received renewed DA-tickets. If time is outside this window, PP-login fails authentication. If not specified, PP-login uses defaults in the site's account. |
| fs | If set to "1" the login server should not renew partners ticket based on Domain Authority tickets, i.e., explicit login credentials will be requested. In addition the login server will instruct the client not to use cached credentials. |

| | -continued |
|---|---|
| server-args-ex | An extensible list of auth-params reserved for future use. Clients ignore auth-params that they do not recognize. |

For clients that preemptively advertise authentication capability in Accept-Auth, that is, those wherein the request from the client includes an "Accept-Auth" header conforming to the proper advertise syntax described above, will have aware servers send the server challenge in an HTTP 401 response.

In keeping with the present invention, for clients that do not advertise their authentication capability, i.e., the request from the client does not include an "Accept-Auth" header, or if the authentication schemes listed in the "Accept-Auth" header do not include the proper third party authentication scheme (e.g., PPauth), then the server sends the server-challenge in an HTTP 302 response with the authentication information added thereto, (also referred to as an HTTP 302 Moved response).

To remain compatible with legacy browsers that achieve authentication via redirection, the equivalent of the server-challenge in the modified 302-redirection (moved) response, such as in the following example:
HTTP/1.1 302 Moved
Location:
"http://login.passport.com/
  login.asp?id=950&TW=43200&FS=0&RU=htt
  p://www.msn.com/passport/passport_default.asp"
WWW-Authenticate: Passport1.4
  site=950,
  ru=http://www.msn.com/passport/passport_default.asp,
  rtw=43200,
  cbtxt="Enter your passport pwd to authenticate in foo
    .com"
<other headers, content follows>

Clients built to this specification ignore the "Location" header in an HTTP 302 response that has the server-challenge defined above. The data in the server challenge is primarily for the login (domain authority) server's use.

After receiving a server-challenge for the first time, the client engages in third party authentication in order to find tickets that will satisfy the server's request. To this end, the client communicates with the third party system to pass the server-challenge (e.g., as is) to the third party's login server. Note that if the client receives a server-challenge after sending a first authenticated request, the client deduces that authentication at the server has failed. Further, if the server responds with a logout directive, the client forgets the tickets it sent in the authenticated request, which is equivalent to expiring cookies. When processing set tickets, the client needs to retrieve the cookies that are named in the list of tname's, store these cookies as third party authentication tickets in its ticket store, but not make these tickets available to the client application as cookies.

The goal of the authentication exchange between the client and the third party login server is to deliver the tickets that the client will later use to authenticate to sites. The login server exchange is very similar to the server exchange, in that the client has to authenticate to the login server. The tickets for the server are the payload of an authenticated response from the login server.

Figure 9B:
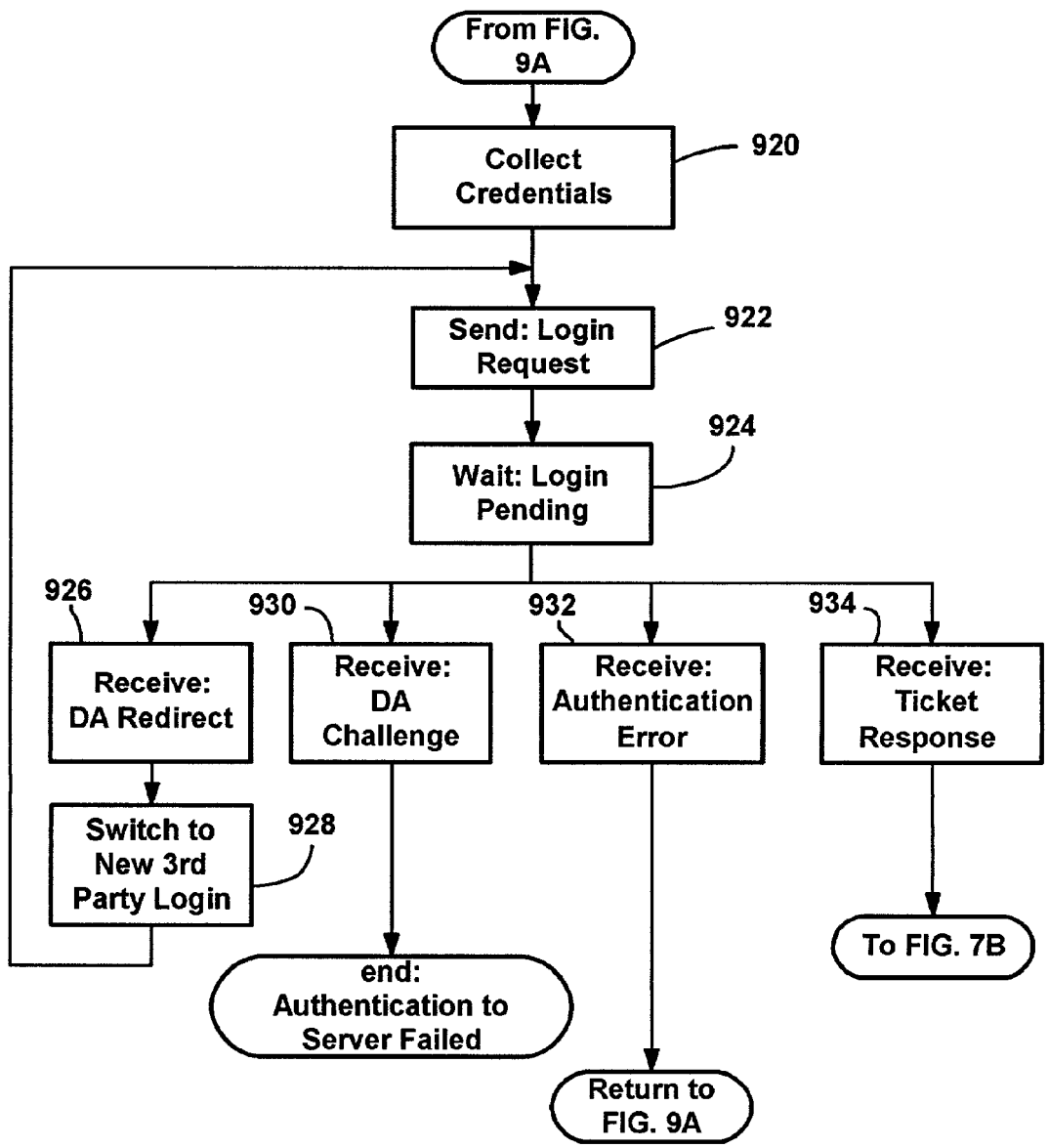

FIGS. 9A and 9B represent the processing that occurs between the client and the login server when authentication tickets are needed. First, at step 900, the client determines the correct login server, such as by communicating with a nexus server as described above, or via instructions from another login server. At step 902, the client then sends a ticket request, and awaits a response at step 904. As described below with reference to FIG. 10, the response to a ticket request may be a domain authority (DA) redirect (block 906), DA challenge (block 910), DA authentication error (block 912), or the ticket response (block 914). A DA redirect is handled by switching to a new login server at step 908 and returning to step 902 to send another ticket request. A DA challenge is handled by the steps described below with reference to FIG. 9B, while a ticket response is handled by the steps described below with reference to FIG. 7B. An authentication error results in any DA tickets being stored at step 916, with the contents (e.g., errorcodes and/or text) of the authentication error returned to the calling client at step 918.

FIG. 9B describes the DA challenge, wherein step 920 represents the collecting of the user's credentials, and steps 922 and 924 represent sending the login request with the credentials and waiting for a response, respectively. As described below with reference to FIG. 10, the response to a login request is similar to that of a ticket request, and may be a domain authority (DA) redirect (block 926), another DA challenge (block 930), a DA authentication error (block 932), or the ticket response (block 934). A DA redirect is handled by switching to a new login server at step 928 and returning to step 922 to send another login request. A DA challenge ends the login, with authentication to the server failed. An authentication error repeats the steps of FIG. 9A, from step 916, which stores any DA tickets, with the contents (e.g., errorcodes and/or text) of the authentication error returned to the calling client at step 918. A ticket response is handled by the steps described below with reference to FIG. 7B.

Once the client decides that it needs to retrieve new tickets, it sends a ticket request to PP-Login containing the server-challenge it just received, along with the DA-tickets. These are delivered in the Authorization header.

| | |
|---|---|
| TR-Authorization = | "Authorization" ":" PPauth-scheme ticket-request |
| ticket-request = | server-challenge |

The list of tnames indicates the cookies that are to be treated as third party tickets. The actual tickets are sent as cookies, and the client uses the GET method to deliver the TR-Authorization header.

The login request contains the user's sign-in name and password as collected by the client, possibly by providing a user interface to the user. If the collection of credentials requires a user interface, the client renders the contents of cburl from the server-challenge in the login dialog. The content delivered from this URL will indicate the partner for which this authentication was started, and needs to indicate authentication mechanism, i.e., the third party such as Passport. The dialog may also have a shortcut to where more information can be found on the third party, e.g., a shortcut to where to get a Passport.

After collecting the credentials, the client sends them to the appropriate third party login server. The client determines the appropriate third party login server according to rules, including that when the client recognizes the sign-in name, and knows a third party login server that successfully served it, then the client should use that server. If the client recognizes the domain portion of the sign-in name and knows of a third party login server that successfully served other sign-in names with the same extension, it should use that server. If the client cannot determine the correct third party login server, it uses a default third party login server.

In addition, login request contains the server-challenge from the original partner server that initiated authentication. This is packaged in an Authorization header, as follows:

| | |
|---|---|
| LR-Authorization = | "Authorization" ":" PPauth-scheme 1#<space> login-request |
| login-request = | [credentials ","] server-challenge |
| credentials = | signin-name "," password ["," time-skew] |
| signin-name = | "sign-in" "=" email-address |
| email-address = | standard email address. |
| password = | "pwd" "=" string |
| time-skew = | "ts" "=" int-value |

LR-Authorization is delivered in a GET request over SSL. The value of time-skew comes from the DA challenge.

FIG. 10 describes the actions performed by the login server for a ticket request (step 1000) or a login request (step 1020). For a ticket request, step 1002 tests whether the domain authority (DA) tickets are OK. If not, step 1002 branches to step 1016 to issue a DA challenge, corresponding to the block 910 in FIG. 9A.

For a login request (step 1020), if the domain authority login server is not correct, the request is redirected via a redirect response at step 1024. If correct, the process continues to step 1004 to evaluate the credentials. If the credentials are not valid, step 1004 branches to step 1016 to issue a DA challenge, corresponding to the block 930 in FIG. 9B.

If in a ticket request the DA tickets are OK at step 1002, or the credentials are OK in a login request at step 1004, step 1006 is performed to issue the tickets. In other words, if the ticket request had OK DA tickets, or the login-request had OK credentials, then the client has successfully authenticated at the DA. Then, at step 1008 the login server determines if the response will have tickets for the originating server by processing the server-challenge to determine whether the user has consent. If not, the login server responds with an authentication error at step 1012. Alternatively, if the tickets can be issued, then the login server prepares the tickets and responds with a ticket response at step 1010, including DA tickets.

Returning to FIG. 7B, once the tickets have arrived, the client stores DA tickets and saves server tickets at step 720. If a return URL was not provided, step 722 branches to step 724 where the client request is set to the original URL, and a first authenticated request is sent at step 732. If a return URL was provided, step 726 compares the original URL with the return URL, and if they are the same, step 728 uses the original verb with the original URL in a request. Otherwise, the original verb is used with the return URL. In any event, the first authenticated request is sent to the server at step 732, and the process continues to step 740 of FIG. 7C to wait authentication.

As described above (with reference to FIG. 8) and as also represented in FIG. 7C, a first authenticated request can result in receipt of a server challenge (step 742), a set ticket response (step 746), a logout response, (step 750), or an authenticated response, (step 754). If a server challenge was received, step 744 is executed, which tests whether the tickets were directly form the domain authority. If so, the authentication fails, otherwise the process continues to step 900 of FIG. 9A, as described above.

If a set tickets response is received, as represented by step 746 of FIG. 7C, the tickets are stored via step 748 and the process ends, having received whatever authenticated content the server wanted to send. Similarly, if a logout response is received as represented by step 746, the tickets are deleted via step 752 and the process ends, again with whatever authenticated content the server wanted to send. If an authenticated response is received at step 754, the process ends, with the authenticated content received at the client.

Turning to a description of the messages sent from the third party login server to the client, one such message is a DA Redir (redirection) message. The third party login server responds with a DA-Redir if it receives a login-request that needs to be served by a different third party login server. The response is a simple HTTP 302 redirect, where the location header contains the URL of the correct third party login server. The response also contains an Authentication-Info header indicating that this is a DA-redirect:

| | |
|---|---|
| DAR-Authentication-Info = | "Authentication-Info" ":" PPauth-scheme da-redir |
| da-redir = | "da-status" "=" "redir" |

Upon receiving a DA-Redir, the client retries the login-request at the indicated URL. The client should also associate this URL with the sign-in name and its domain extension with this new third party login server.

A DA-Challenge message comprises an HTTP 401 response indicating that the login request or the ticket request has failed. The DA-challenge is very similar to the server-challenge, as shown in the example below:

| | |
|---|---|
| DA-WWW-Authenticate = | "WWW-Authenticate" ":" PPauth-scheme da-challenge |
| da-challenge = | "da-status" "=" ("failed" \| "failed-noretry") "," srealm ["," time-skew] ["," prompt"] ["," cburl]["," cbtxt] |
| srealm = | "srealm" "=" realm-name |

If a prompt is present, the client is instructed not to use persistent credentials store, but rather to prompt the user to physically enter (e.g., type in) the password. The DA needs the client to return the time-skew value with the credentials, so the site ticket can be appropriately stamped. The da-status, if set to "fail", means the client may prompt user for credentials. If set to "fail-noretry," the client should handle the error by returning the 401 status and HTML content to the application. The "srealm" parameter is the name of the passport namespace (or tree), given because a name is still needed. It will be hardcoded on the DA side—e.g. "Passport.NET".

The third party login server sends a ticket success response when it can issue tickets that will be satisfactory to the originating server. The response includes the DA tickets and the tickets for the server. The tickets will be sent as cookies, and are packaged in an Authentication-Info header, such as in the example table below:

| | |
|---|---|
| TSR-Authentication-Info = | "Authentication-Info" ":" PPauth-scheme 1#<space> t-success-response |
| t-success-response = | da-success ["," 1#(tname)] "," from-PP ["," "ru=" return-URL] |
| da-success = | "da-status" "=" "success" |
| from-PP = | "from-PP" "=" quoted-string |

The third party login server sends a ticket error (Auth Error message) response when the client is successfully authenticated at the DA, but tickets to authenticate it to the original server cannot be issued. This will typically be the case when the user does not have consent for this site. Note that this is a failed authentication, since the client cannot gain access to the original target URL on the participating site. Therefore, it is delivered in a 401 response with a WWW-Authenticate header. On the other hand, the client did gain access to the DA, so the DA tickets are included in the response:

| | |
|---|---|
| TER-WWW-Authenticate = | "WWW-Authenticate" ":" PPauth-scheme ["," 1#(tname)] "," t-error-response |
| t-error-response = | da-error |
| da-error = | "da-status" "=" "failed" |

The list of tnames indicates the cookies that need to be treated as Passport DA tickets. The actual tickets are sent as cookies.

The client processes the messages from the third party login server including processing DA Redir messages. For DA Redir messages, the client sends the same response to the new third party login server given in the "Location" header of the response. If the request was a login request, the client should associate this new third party login server with the sign-in name.

To process a DA Challenge at the client, if da-status is "failed-noretry", the client should return an error and HTML content to the rendering application. This is typically a case where resending the credentials is no good, e.g., the account is locked out. If da-status is "failed" and the request was Ticket Request, the client needs to collect credentials and try a login Request. If the request was login request, the client deduces that the credentials were bad, and hence, authentication has failed.

When processing a ticket response, the client stores the DA tickets, retrieves the opaque data in the "from-PP" parameter, and sends a First Authed Request to the original participating (partner) server with this from-PP data. If return-URL was present in the response, the client should go to this URL. To Process an Auth Error, the client store the DA tickets, deduces that authentication to the original participating server has failed. The client may render the content of the 401 message to inform the user, e.g., to let the user decide what to do about the error.

As part of its configuration mechanism, the client needs to know at least the location of the default DA to successfully perform authentication. In order to render credential collection UI, the client also needs to know the URL of the third party image and the URL to where it should be linked. The authentication protocol assumes that the client has knowledge of this configuration prior to attempting authentication.

The client may use an out-of-band mechanism to the third party (e.g., Passport) servers to acquire this configuration online. In this implementation, a client that uses some other means to acquire configuration information can still successfully take part in third party authentication, although such other configuration mechanisms may be unreliable and in time be unsupported.

Passport operates a nexus service as a single, well-known URL that will be maintained forever. For example, in the live Passport environment, the URL of the Nexus lookup service is:

https://nexus.passport.com/rdr/pprdr.asp

Note that other URLs described herein, including the URL's of default and secondary DA's are only examples and/or subject to change.

Communication with the Nexus is secure, e.g., via SSL. The Nexus will have a current and valid certificate, therefore, clients are to reject any URL that poses as the Nexus but has certificate problems. The following information is available from the Nexus:

| Tag | Description |
|---|---|
| ConfigVersion | The version of the configuration info for this realm, a non-zero positive numeric value. |
| DARealm | The name of the third party authentication service (Passport) realm that this Nexus describes. "Passport.NET" for the Live third party authentication service environment. |
| DALogin | The URL to the default DA of this realm. |
| DAReg | The URL to the registration and maintenance website for this realm. |
| Help | The URL where the Help is available in this realm. |
| Privacy | URL of human-readable privacy policy for the realm |
| Properties | URL that displays the properties of a third party authentication service account in this realm (edit/view profile) |
| GeneralRedir | General purpose redirector URL |

The Nexus may choose to tailor the configuration based on what it can infer about the client from the HTTP request headers and any other description the client may give about its own capabilities. In order to obtain configuration information from the Nexus, client sends a valid HTTP GET or POST request to the Nexus. If the client has no specific description about its own capabilities, it should use a GET request with an empty entity body.

If the request is well-formed, Nexus composes an HTTP 200 response containing a header, e.g., of the following form:

| | |
|---|---|
| PassportURLs = | "PassportURLs" ":" ConfigVersion "," DARealm "," DALogin "," DAReg "," Help "," Privacy "," Properties "," GeneralRedir 1#["," param] |
| ConfigVersion = | "ConfigVersion" "=" token |
| DARealm = | "DARealm" "=" token |
| DALogin = | "DALogin" "=" token |
| DAReg = | "DAReg" "=" token |
| Help = | "Help" "=" token |
| Privacy = | "Privacy" "=" token |
| Properties = | "Properties" "=" token |
| GeneralRedir = | "GeneralRedir" "=" token |
| param = | token "=" token |

The Nexus may also return these and additional name-value pairs in the entity body.

The client updates the configuration when the realm is not configured, when the URL for the default DA is not configured, or the configured URL is not responding properly, and/or when instructed by the DA. In addition, clients that present UI for credential collection update the configuration when the Help, Privacy, or DAReg is not configured, and/or when DAReg is not configured. In addition, the client may unilaterally decide to retrieve the configuration at any time.

To give an indication of the current configuration, the DA MAY include the following response header in any of the DA response messages:

| | |
|---|---|
| ConfigData = | "PassportConfig" ":" ConfigVersion 1#["," param] |
| ConfigVersion = | "ConfigVersion" "=" token |

The client should update its configuration if it has no value stored for ConfigVersion or the value it has stored is numerically less than the version returned from the DA. The client should not update its configuration if its ConfigVersion is equal to or less than the ConfigVersion returned from the DA.

For user input and text that is displayed to the user, the following may be noted:
Encoding: trasmit=URLEscape (UTF8Encode(string)) at source, reverse at destination.
Signin-name and pwd: source is client, destination is DA.
Cbtxt: source is partner/PPM or DA, destination is client.

For URLs and other text that may contain the special characters +'",=:
Encoding: transmit=URLEscape(string)
OrgURL: source is cleint, destination is DA.
cbURL: source is DA, destination is cleint.
RU: source is partner/DA, destination is client.

In one implementation, the browser code (e.g., Wininet) uses the system registry to store the nexus configuration and the mapping of sign-in name to DA URL. The Nexus configuration data resides in:

HKEY_LOCAL_MACHINE\SOFTWARE\Microsoft\Windows\CurrentVersion\Internet Settings\Passport Under this registry key, the "NexusHost" and "NexusObj" keys together contain the URL of the configuration file on the Nexus. If NexusHost contains an empty value (" ") or does not exist, Wininet uses the well-known Nexus location (https://nexus.passport.com/rdr/pprdr.asp), which may be hardcoded into the browser code. Values returned from the Nexus configuration are stored as other keys in this registry:

| Tag from Nexus | Reg Key Value |
|---|---|
| ConfigVersion | ConfigVersion |
| DARealm | LoginServerRealm |
| DALogin | LoginServerURL |
| DAReg | RegistrationURL |
| Help | Help |
| Privacy | Privacy |
| Properties | Properties |
| GeneralRedir | GeneralRedir |

The browser code (e.g., Wininet) uses a GET over SSL to connect to the Nexus location. In one implementation, the browser code only looks in the PassportURLs header, and only parses the parameters shown in the table above. Other information returned from the URL is discarded.

The DA map is under:

HKEY_CURRENT_USER\Software\Microsoft\Windows\CurrentVersion\Int ernet Settings\Passport\DAMap. Under this key, there are zero or more name value pairs where value name is the domain portion of the sign-in name (e.g. @hotmail.com) and value data is the URL of the secondary DA:

(https://loginp.pav0.hotmail.passport.com/login2.asp).

The browser code populates the DAMap when a Login-Request to a DA results in da-status=redir, and, potentially after a chain of DA-redirs), the Login-Request to the final DA is successful.

If both conditions are met, the browser code adds the domain-URL pair into the DAMap. If the domain exists in the DAMap, then the new pair replaces the old one. If DAMap cache is full, one of the entries is replaced. Note that at this point the size of the DAMap cache is 1, therefore, the browser code will replace the existing entry in DAMap.)

ConfigVersion on the login server and on the Nexus are kept in synchronization. When there is a change to the configuration, the Nexus configuration file picks up the change, and the hardcoded ConfigVersion is updated. The machines in the set of login servers may be selectively updated for new Configversion. The clients that hit the updated login servers get new config from Nexus. The clients that are updated but subsequently hit un-updated login servers do not rollback. Eventually, the set of login servers will be updated for the new ConfigVersion. At this point, the landing points of the old configuration can be turned off, and if any un-updated clients remain, their configuration will fail. The browser code (e.g., Wininet) will detect the failure and update the configuration from Nexus.

The configuration mechanism thus comprises a dynamic client configuration mechanism that allows the client to dynamically retrieve information about the authentication service, and allows the client to store this information locally. With the configuration mechanism, the authentication service is able to notify the client of any changes in the configuration information, while allowing the client to discover the new authoritative configuration in the case of such a change and appropriately update its cache. The configuration mechanism enables clients to discover new authentication servers in the same authentication service and cache their locations, and allows the authentication service to direct and control these operations by embedding headers in authentication messages in the exchange with the client.

Figure 11A:
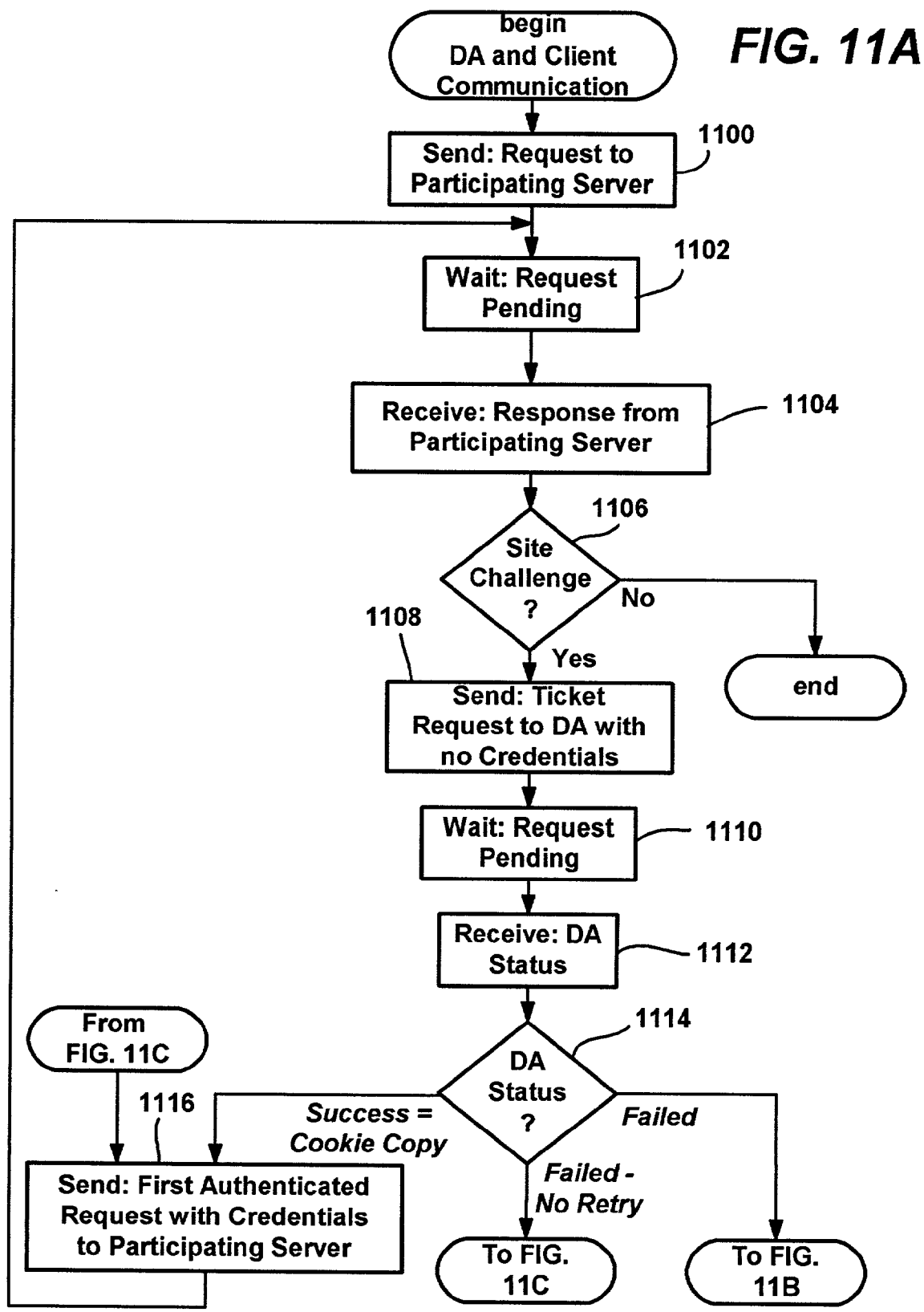
FIGS. 11A–11C comprise a flow diagram generally representing communication between a client and a third party domain authority in accordance with an aspect of the present invention.
Figure 11B:
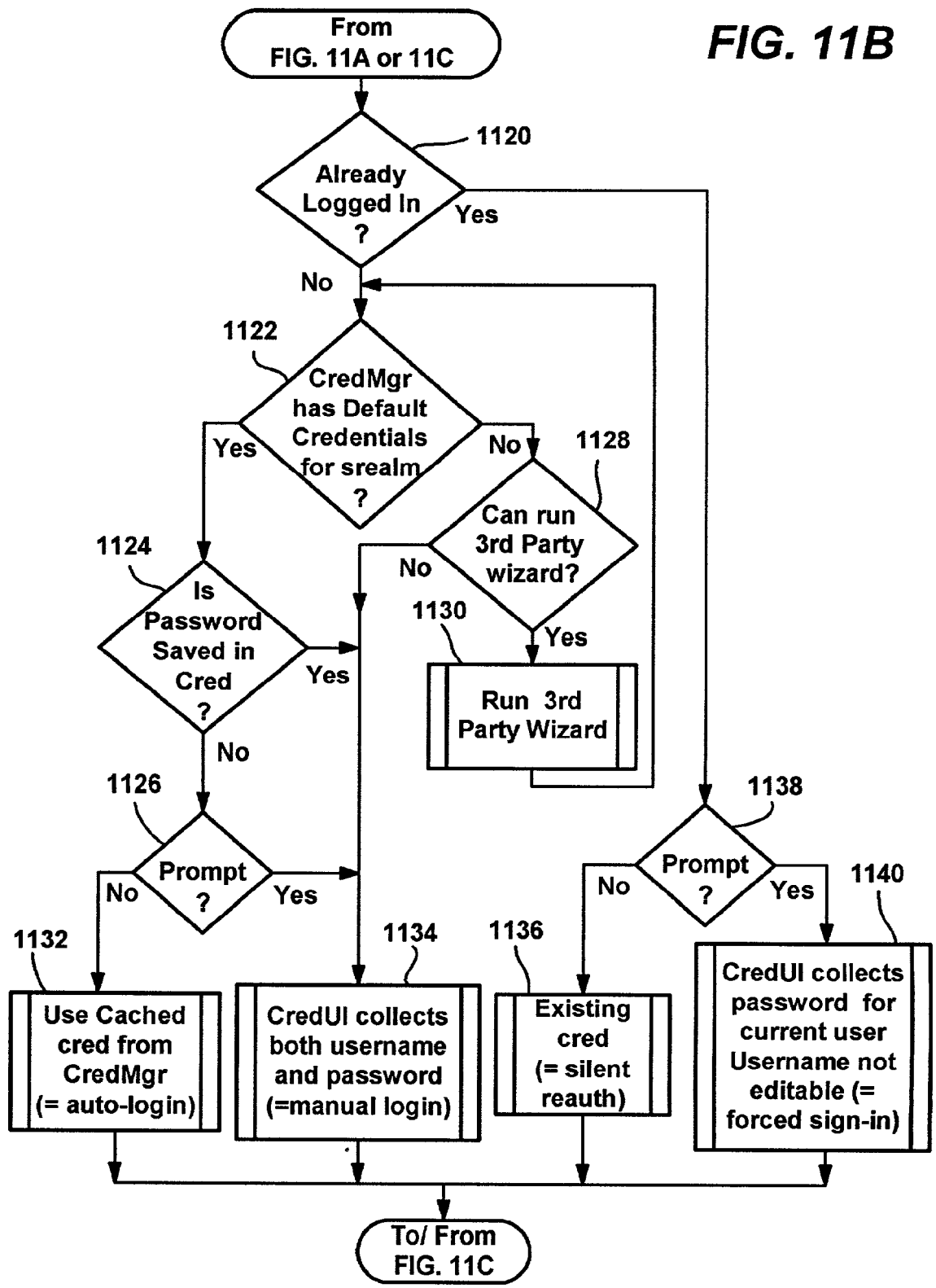
Figure 11C:
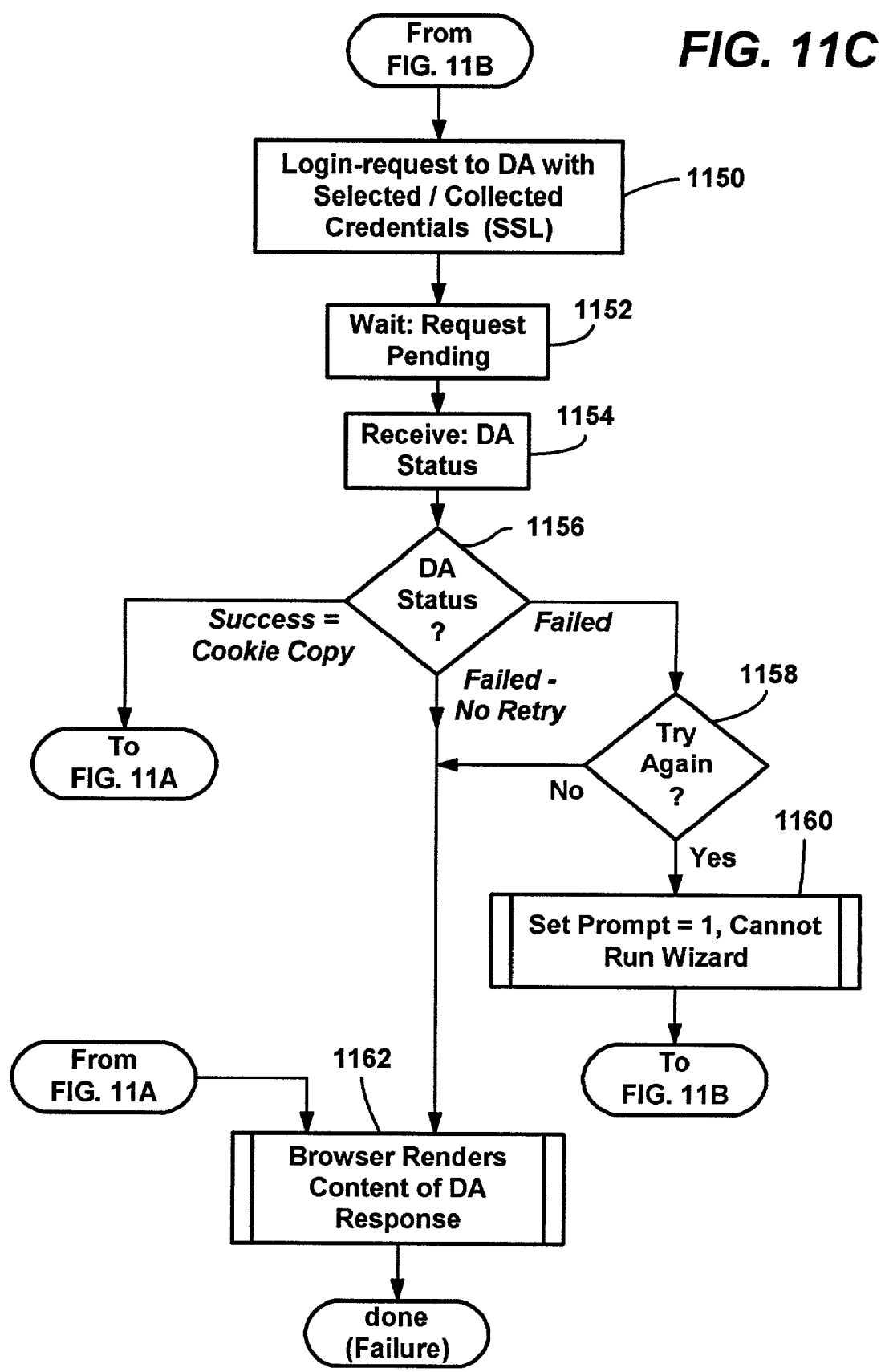

FIGS. 11A–11C represent client logic and the message traffic with the DA, comprising an aggregate of the message flows described above, and incorporates the credential decisions made by various client components, e.g., Wininet, Internet Explorer (IE), the credential manager (CredMgr), a Passport Wizard, and credential user interface (CredUI). Note that DA-redir is not included in this diagram for simplicity. In general, when da-status=redir, the previous request to the DA should be repeated against the new DA. If the response from that DA is da-status=success, the new URL should be cached in DAMap. Also, a user may click "Cancel" in credUI or in the Passport wizard, in which event the browser code should render the content of the DA-response. The client should also choose the right DA, as described below with reference to FIG. 12.

At step 1100 of FIG. 11A, the client sends a request to a participating server, and after waiting (step 1102), receives a response. If the response is not a site challenge as detected at step 1106, this portion of the client logic is over, and other logic proceeds, as described above. If the response is a site challenge, step 1108 sends a ticket request to the DA, with no credentials. Steps 1110 and 1112 represent the waiting for and receipt of the DA status response, respectively.

Step 1114 evaluates the response. If the status indicates success, step 1116 is executed to send an authenticated request to the participating server, before returning to step 1102 to await the response. If the status is a fail no retry, then the process branches to step 1162 of FIG. 11C, where the browser renders content based on the DA response, and the process ends as a failure. If the status is failed, i.e., failed with retry OK, then the process continues to FIG. 11B.

Step 1120 of FIG. 11B tests whether the user is already logged in, e.g., whether there a logged in Passport user in this process, which is "Yes" if the browser code successfully logged in a user account previously, and there has not been a logout since, otherwise "no" is the result. If "yes", then the browser code knows the user's credentials, and the process branches to step 1138 where the client decides whether the user is to be prompted. If not, step 1136 represents using the existing credentials before continuing to step 1150 of FIG. 1C, while if so, step 1140 represents the collecting of the password for the current user. Note that the prompt decision evaluates whether there a reason to prompt, which is "Yes" if either DA sent a "prompt" parameter in the DA-challenge, if there has been a previous logout, and this is the first login since then, or the Login-request has just failed.

Returning to step 1120, if not already logged in, step 1122 is executed to test whether the credential manager has default credentials for the srealm. If so, step 1122 branches to step 1124 where it is determined whether the password is saved in the credentials. If so, step 1134 is executed as described below. If not, step 1126 is executed to decide whether the user is to be prompted for the credentials; if not, cached credentials are used (step 1132), while if so, step 1134 is executed to collect the credentials.

Returning to step 1122, the credential manager does not have default credentials, step 1128 is performed to determine whether the third party wizard (e.g., Passport wizard) can be run. If so, step 1130 runs it and thereafter returns to step 1122. If unable to run, step 1128 branches to step 1134 where the credentials are collected. The process continues to step 1150 of FIG. 11C.

At step 1150 of FIG. 11C, a secure login request to the login server of the DA is made with the selected/collected Credentials, using SSL. Step 1152 represents awaiting the response, while step 1154 represents receiving the DA status response. Step 1156 evaluates the response, and if successful, returns to step 1116 of FIG. 11A, as described above. If the status indicates failed no retry, step 1162 is executed, as also described above. If the status indicates failed with retries allowed, step 1158 determines whether to allow the client to try again. If not, step 1162 is executed and the process ends, otherwise step 1160 is executed to prepare for a retry requiring prompts, before returning to step 1120 of FIG. 11B.

Figure 12:
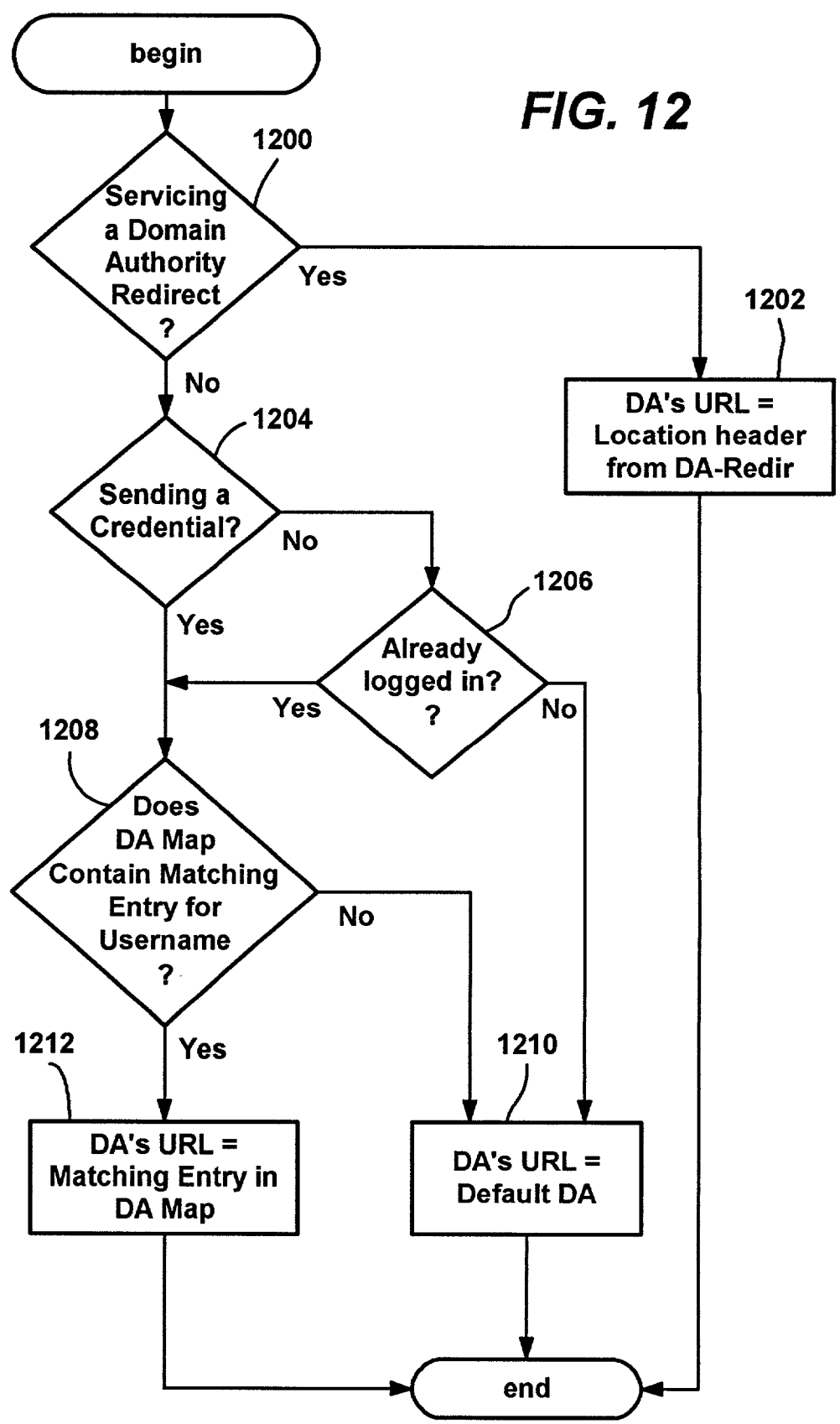
FIG. 12 is a flow diagram generally representing steps for handling client requests at a domain authority in accordance with an aspect of the present invention.

FIG. 12 represents the logic of how the correct domain authority (DA) is located. Step 1200 tests whether the client is handling a DA redirect. If so, step 1202 is executed, setting the URL of the DA to that provided in the DA redirect response so as to redirect appropriately, and the DA determination process ends. If not, step 1204 is performed to test whether the client is sending a credential. If not, step 1204 branches to step 1206 to determine whether the client is already logged in. If sending a credential at step 1204 or already logged in at step 1206, step 1208 is performed, as described below. Otherwise, step 1210 is performed to set the URL of the DA to the default DA URL, and the DA determination process ends.

Step 1208 tests whether the DA map contains a matching entry for the username. If so, step 1212 is performed to use the DA's URL in the map. If not, step 1210 is performed to set the URL of the DA to the default DA URL. The DA determination process then ends.

Additional Protocol Details and Examples

The DA has the following points of control on the UX of the CredUI dialog:

fs: "prompt" flag, a parameter in the WWW-Authenticate header in the DA-challenge. Set according to "fs" from partner per request. If prompt==1, the browser code (e.g., Wininet) will ignore the cached credentials in CredMgr and return HTTP_STATUS=401 and ERROR_LOGIN_FAILED to the calling application. Typically, the application will handle this by calling InternetErrorDlg( ), which renders CredUI for credential collection. If there is an existing PP user already authenticated in the application's process, CredUI will fill the username field with his/her membername and gray the field out. Otherwise, the username will be editable, pre-filled with the membername of the default passport, with a dropdown for the other passport accounts cached on in CredMgr.

cburl: URL of the partner's brand image, a parameter in the WWW-Authenticate header in the DA-challenge. Set in partner configuration db as CobrandImageURL2. CredUI will display the image from this URL as the partner branding.

cbtxt: Localized, properly escaped UTF-8 string, a parameter in the WWW-Authenticate header in the DA-challenge. Set in partner configuration db as InstructionText. CredUI will display this as instruction text in the dialog.

Entity body of the HTTP 401 response that delivers the DA-challenge. If the browser code (e.g., Wininet) returns HTTP_STATUS=401, ERROR_LOGIN_FAILED to the calling application, this will be returned as the content of the response. HTML rendering applications (most notably IE, Trident controls) will render this when they decide that auth has failed. They will make this decision if a) the user cancels CredUI, or if b) user tries for N=3 times and cannot get through. The DA has no motivation to override the partner preferences cburl. Similarly, the value of "prompt" will reflect the partner's choice over force-sign-in. To handle user errors, the DA will use:

cbtxt to control the messaging in CredUI, and, the entity body of the DA-challenge to control visible content.

The client will use SSL for communication with the DA, including Ticket-Request, Login-Request, follow-up on DA-redirs. The browser code (e.g., Wininet) enables HTTP Keep-Alive on these connections in order to reuse the SSL session.

The protocol is invoked by different APIs at the participating server's program manager, which include AuthURL2( ), LogoTag2( ) and LogonUser( ). In addition to these, more recent versions of the program manager include a GetLoginChallenge( ) API. These APIs offer convenient ways to generate the site challenge, add optional parameters such as localized cbtxt, and so forth. They also make sure that the site-challenge for the 1.4 protocol is in agreement with the query-strings for the 1.0 protocol. AuthURL2( ) and LogoTag2( ) achieve functional compatibility with their previous versions using an HTTP filter and are provided for ease of migration. GetLoginChallenge( ) and LogonUser( ) are the recommended API's.

The following site attributes support the UX and behavior of this protocol, including CoBrandImage2Url, the URL of a 102×80 logo of the partner site, and CoBrandInstructionText, the default text to show in CredUI.

Thus, for example, in one implementation the CredUI implements UI features and stores Passport credentials under "Passport.NET" realm. The Passport Wizard aides in getting a new passport. Other OS components link to server side functionality provided by Passport. Wininet 6.0 implements auth protocol (on by default), implements a configuration protocol. IE 6.0 uses protocol, credUI, and credMgr.

In another implementation, Wininet 6.0 implements auth protocol (off by default), Wininet 6.0 implements the configuration protocol, and IE 6.0 has the protocol turned off.

Platform API
- Wininet 6.0 API: Passport1.4 treated as another HTTP auth mechanism in existing API. New InternetOption flag to turn on protocol handling on downlevel OS's.
- CredMgr API: Passport.NET treated as an authentication target realm. Available only on Whistler
- CredUI: Passport1.4 treated as a special auth mechanism. UI modifications as compared to other auth mechanisms. Available only on Whistler.

Example Scenario

Cast
- Laurel: Passport user, has a member account.
- Rusty: Her son, aged 8, has a Kids Passport account.
- SpottedCow.com: The site dedicated to Rusty's favorite cartoon character. SpottedCow.com is a Passport partner which uses Kids Passport consent service for COPPA compliance.
- Disney.com: Another kids targeted Passport partner that handles its own consent process.
- MSN network and sites: Laurel and Rusty use MSN sites as their primary web portal.

Task
We are going to follow Rusty do the following:
- Rusty starts browsing the web at MSN. He clicks Sign-In. He is prompted; he enters his passport credentials.
- SpottedCow is featured in the Kids section of MSN. He wants to see what's up.
- Since he has not been to SpottedCow before, he needs his mother's permission.
- Rusty and his mother start the consent process, at the end of which Laurel gives consent for him to view SpottedCow.
- Rusty goes to SpottedCow.
- He gets distracted by an advertisement for MSN Chat.
- He does not have consent for Chat, and his mom tells him that chatting online is bad. They had this conversation before, so he gives up and goes to Hotmail to read his mail.
- One of his friends sent him a link on Disney.com. He clicks on the link. Disney recognizes that he is a kid; and since he is new to the site, Disney starts its own consent process.

Passport Message Exchange

Initial Login

Passport authentication will begin when Rusty clicks the sign-in button on www.msn.com. When he clicks the button, the browser issues the following request:
GET http://www.msn.com/passport_frontdoor.asp
?id=950&TW=43200&FS=0&RU=http://www.msn-.com/passport/passp ort_default.asp HTTP/1.0 passport_frontdoor.asp is the central redirection URL on www.msn.com to which the sign-in/out buttons link. This page responds with the following:
HTTP 302 Moved
Location:
http://login.passport.com/
login.asp?id=950&TW=43200&FS=0&R
U=http://www.msn.com/passport/passport_default.asp
WWW-Authenticate: Passport1.4 site=950,
return=http://www.msn.com/passport/passport_default.asp,
cbtxt='Welcome to MSN. Please sign-in with your passport.',
rtw=43200

The Location header indicates the URL where legacy browser clients can perform SSI 1.0 with cookies and query string parameters. However, 1.4 client recognizes this response as a server challenge and proceeds with the client-server exchange, first issuing a ticket request with empty DA tickets:
GET/login14.asp HTTP/1.1
Host: login.passport.com
Authorization: Passport1.4
site=950,
return=http://www.msn.com/passport/passport_default.asp,
cbtxt='Welcome to MSN. Please sign-in with your passport.',
rtw=43200 login14.asp is the page on The third party login server that handles only SSI 1.4 authentication requests. The empty tname indicates that the client has no DA tickets. Therefore, The third party login server responds with a DA challenge:
HTTP 401 Unauthorized
WWW-Authenticate: Passport1.4
da-status=failed,
site=950, srealm=passport.com,
return=http://www.msn.com/passport/passport_default.asp,
cburl=http://www.msn.com/images/pp14logo.gif,
cbtxt='Welcome to MSN. Please sign-in with your passport.',
rtw=43200, ts=2

The client recognizes that it needs to collect credentials from the user. It acknowledges this to the client application, which calls the appropriate dialog. Note that the response includes the original server challenge, which has a URL for the site's logo and ux for the text to be displayed to the user in the dialog. When the dialog pops up, it shows the MSN logo at the top, and displays the text between ' '.

Rusty enters his sign-in name, "rusty@hotmail.com" and password, "goalkeeper". He clicks OK.

The client sends these credentials in a Login request, over SSL:
GET/login14.asp HTTP/1.1
Host: login.passport.com
Authorization:Passport1.4
sign-in =rusty@hotmail.com, pwd=goalkeeper,
site=950,
return=http://www.msn.com/passport/passport_default.asp,
cbtxt='Welcome to MSN. Please sign-in with your passport.',
rtw=43200, ts=2

The third party login server responds over SSL with the ticket response:

HTTP 200 OK
Authentication-Info: Passport1.4
   da-status="success", tname=MSPAuth, tname=MSPProf,
   from-PP="t=blob&p=blob&opaque"
Set-Cookie: MSPAuth="da-auth blob in passport.com";
Set-Cookie: MSPProf="da-prof blob in passport.com";

The client recognizes the tickets and stores them away. The from-PP parameter contains the information that needs to be passed to the partner server. The client uses this to retry the request at the return url, in a first-authenticated request:

GET http://www.msn.com/passport/passport_default.asp HTTP/1.0
Authorization=Passport1.4
   from-PP='t=blob&p=blob&opaque'

PPM running at this URL recognizes the auth header in the request. Since this is the first authenticated request, PPM responds by setting tickets:

HTTP 200 OK
Authentication-Info: Passport1.4
Set-Cookie: MSPAuth="auth blob in msn.com";
Set-Cookie: MSPProf="prof blob in msn.com"
Set-Cookie: MSPCAuth="c auth blob in www.msn.com";
Set-Cookie: MSPCProf="c prof blob in www.msn.com";

The client recognizes the tickets and stores them away. Now Rusty is authenticated to msn.com, and further more, Passport has revealed his consent status for www.msn.com.

Subsequent Pre-Authenticated Browsing

Rusty navigates to another page in www.msn.com. Since he is already authenticated, the client sends an authenticated request this time:

GET http://www.msn.com/default.asp HTTP/1.0
Cookie: MSPAuth="auth blob in msn.com";
Cookie: MSPProf="prof blob in msn.com";
Cookie: MSPCAuth="c auth blob in www.msn.com"
Cookie: MSPCProf="c prof blob in www.msn.com"

Consent Required

Rusty now navigates to SpottedCow.com. Rusty clicks to signup for the newsletter. SpottedCow displays a page explaining that they need his email address, and his parents consent. Rusty clicks signup. This link starts Passport authentication:

GET http://spottedcow.com/signup.asp HTTP/1.0
Which responds with:
HTTP 302 Moved
Location:
http://login.passport.com/
   login.asp?id=2588&TW=32000&FS=0&kpp=2&RU=http://spottedcow.com/signup.asp
WWW-Authenticate: Passport1.4
   site=2588,
   cbtxt='To signup to the newsletter, please sign-in with your passport.',
   nkpp=2,
   rtw=32000

The client recognizes the response as a server challenge. Since there are not tickets for spottedcow.com, the client starts the client-Passport exchange to request tickets.

GET/login14.asp HTTP/1.1
Host: login.passport.com
Authorization: Passport1.4
   site=2588,
   cbtxt='To signup to the newsletter, please sign-in with your passport.',
   kpp=2,
   rtw=32000
   Cookie: MSPAuth="da-auth blob in passport.com";
   Cookie: MSPProf="da-prof blob in passport.com";

Since Rusty is already signed in, the DA tickets go with the request.

Rusty's tickets are OK. However, the contents of t-args indicate that the site requires consent. Since Rusty, does not have consent for spottedcow.com, his authentication fails. The third party login server responds with and auth error message:

HTTP 401 Unauthorized
Authentication-Info: Passport1.4
   da-status=consent-error,
   from-PP='t=blob&p=blob&opaque',
Set-Cookie: MSPAuth="da-auth blob in passport.com";
Set-Cookie: MSPProf="da-prof blob in passport.com";
<HTML blob as content>

At this point, the authentication to SpottedCow.com has failed. [Note that if the kpp parameter is 1, The third party login server sends with a successful ticket response, and authentication will succeed. The server is then expected to use the data within the ticket and profile to determine if the user is a kid and start its own consent process.]

Consent Process

The browser renders the XML content as a page explaining that Rusty does not have consent to view SpottedCow.com. It asks, "Are your parents home?" and "Yes!" links to the first page of the consent flow on kids.passport.com. Rusty grabs his mother and clicks "Yes!":

GET/explain.asp HTTP/1.1
Host: kids.passport.com
Authorization: Passport1.4
Cookie: MSPAuth="da-auth blob in passport.com";
Cookie: MSPProf="da-prof blob in passport.com";

The page renders content addressing the parent. It also logs Passport out of Passport so that Laurel can log in:

HTTP 200 OK
Authentication-Info: Passport1.4
   status="logout"
<Content addressing parent, explaining the consent process, and links to "Start". The link has query string params to indicate Rusty's passport id.>

The client recognizes the logout directive and forgets the tickets it sent with the original request.

Laurel clicks the link "Start":
GET/start.asp?kppvc=RustyID HTTP/1.1
Host: kids.passport.com The response from this URL is a regular server challenge:
HTTP 302 Moved
Location:
http://login.passport.com/
   login.asp?id=9&kpp=2&RU=http://kids.passport.com/start.asp?kppvc=RustyID
WWW-Authenticate: Passport1.4
   site="9 passport.com kids.passport.com",
   ux="tx1='To start the consent process, please sign-in with your passport.'"

Client recognizes the challenge and requests tickets from The third party login server. However, Laurel is not authenticated:

GET/login14.asp HTTP/1.1
Host: login.passport.com
Authorization: Passport1.4
   tname=,
   site="9 passport.com kids.passport.com",
   ux="tx1='To start the consent process, please sign-in with your passport.'"

Since she is not authenticated, The third party login server responds with a DA challenge:
   HTTP 401 Unauthorized
   WWW-Authenticate: Passport1.4
      da-status="failed",
      site="9 passport.com kids.passport.com",
      ux="tx1='To start the consent process, please sign-in with your passport.'"
This brings up the login UI, where Laurel enters her passport credentials. The client sends the credentials over SSL:
   GET/login14.asp HTTP/1.1
   Host: login.passport.com
   Authorization: Passport1.4
      sign-in ="laurel@passport.com", pwd="marinersRock",
      site="9 passport.com kids.passport.com",
      ux="tx1='To start the consent process, please sign-in with your passport.'"
Login is successful, and The third party login server returns her tickets:
   HTTP 200 OK
   Authentication-Info: Passport1.4
      da-status="success",
      tname="MSPSec", tname="MSPAuth", tname="MSPProf",
      from-PP="t=blob&p=blob&opaque"
   Set-Cookie: MSPSec="da-sec blob in passport.com/ppsecure";
   Set-Cookie: MSPAuth="da-auth blob in passport.com";
   Set-Cookie: MSPProf="da-prof blob in passport.com";
Now the client can retry the original request to kids.passport.com. Since the server challenge from kids.passport.com had no return argument, the client tries the original request again:
   GET/start.asp?kppvc=RustyID HTTP/1.1
   Host: kids.passport.com
   Authorization: Passport1.4
      from-PP="t=blob&p=blob&opaque"
This authenticates her to kids.passport.com. Note that the kppvc parameter in the query string identifies Rusty's passport account. Therefore, Kids server may proceed with the consent flow to associate Rusty's account with Laurel's and let her grant consent for SpottedCow.com.

At the end of the consent process, Kids server will send a page that logs out Laurel and lets Rusty log back in.
   HTTP 200 OK
   Authentication-Info: Passport1.4
      status="logout"
   <Content addressing kid, explaining the consent process is complete, and links to "Go back to SpottedCow.com". The link has query string params to indicate Rusty's passport id.>

Consented Kid

When Rusty clicks the link, this takes him to the newsletter signup page. The page issues the server challenge, which as before causes the client to request tickets from The third party login server. That in turn causes the login dialog to appear. Rusty logs in. This time, he has consent, so the response from The third party login server is a successful ticket response:
   HTTP 200 OK
   Authentication-Info: Passport1.4
      da-status="success",
      tname="MSPSec", tname="MSPAuth", tname="MSPProf",
      from-PP="t=blob&p=blob&opaque"
   Set-Cookie: MSPSec="da-sec blob in passport.com/ppsecure";
   Set-Cookie: MSPAuth="da-auth blob in passport.com";
   Set-Cookie: MSPProf="da-prof blob in passport.com";
The client proceeds with sending from-PP to SpottedCow.com, which authenticated Rusty at the site.

Different Consent Status for Sites in Same Domain

All this messages have been exchanged in vain because as soon as Rusty gets authenticated at SpottedCow.com, he gets distracted by an add for MSN Chat. He clicks on it. This takes him to the front page of MSN Chat. He is already signed in to MSN, so the client sends the following authenticated request:
   GET http://chat.msn.com/default.asp HTTP/1.0
   Authorization: Passport1.4
      tname="MSPAuth", tname="MSPProf"
   Cookie: MSPAuth="auth blob in msn.com";
   Cookie: MSPProf="prof blob in msn.com";
Since he is signed in, the Passport button indicates he is authenticated. Note, however, that the consent tickets were issued in www.msn.com. Therefore, these are not sent to Chat. Rusty clicks on one of the adult chat rooms, and the client sends a similar request.
   GET http://chat.msn.com/cyberlove.asp?roomId=xyz HTTP/1.0
   Authorization: Passport1.4
      tname="MSPAuth", tname="MSPProf"
   Cookie: MSPAuth="auth blob in msn.com";
   Cookie: MSPProf="prof blob in msn.com";
The page at this URL recognizes that he does not have consent tickets and therefore returns a server-challenge:
   HTTP 302 Moved
   Location http://login.passport.com/
      login.asp?id=500&TW=43200&FS=0&R
   U=http://chat.msn.com/cyberlove.asp?roomId=xyz
   WWW-Authenticate: Passport1.4
      site="500 passport.com msn.com",
      cburl="http://chat.msn.com/images/chatlogo.gif",
      ux="tx1='Please sign-in with your passport to verify access.'",
      rtw=43200
The client sends a ticket request to The third party login server:
   GET/login14.asp HTTP/1.1
   Host: login.passport.com
   Authorization: Passport1.4
      tname="MSPAuth", tname="MSPProf",
      site="500 passport.com msn.com",
      cburl="http://chat.msn.com/images/chatlogo.gif",
      ux="tx1='Please sign-in with your passport to verify access.'",
      rtw=43200
   Cookie: MSPAuth="da-auth blob in passport.com";
   Cookie: MSPProf="da-prof blob in passport.com";
Rusty's DA tickets are OK. However, his mom has explicitly denied consent for Chat. Therefore, The third party login server responds with auth-error:
   HTTP 401 Unauthorized
   Authentication-Info: Passport1.4
      da-status="consent-error",
      tname="MSPSec", tname="MSPAuth", tname="MSPProf",
      from-PP="t=blob&p=blob&opaque"
   Set-Cookie: MSPSec="da-sec blob in passport.com/ppsecure";

Set-Cookie: MSPAuth="da-auth blob in passport.com";
Set-Cookie: MSPProf="da-prof blob in passport.com";
<XML blob as content>

At this point, the authentication to chat.msn.com has failed. The content, when rendered, explains to Rusty what just happened.

Successful Silent Authentication for Consented Kid

Discouraged, Rusty follows the link in the content, and then clicks on Hotmail.

Hotmail recognizes that he is authenticated, but just like chat, it cannot find any consent tickets. Therefore, it issues a server challenge.

Handling the challenge, client requests tickets for Hotmail.

Laurel has granted consent for Hotmail. So tickets come back fine.

Client sends from-PP to Hotmail.

Rusty's inbox appears.

As can be seen from the foregoing detailed description, there is provided a method and system that enables use of a client's local system-based authentication mechanism for updated browsers. For legacy browser code that is not capable of handling the new type of authentication, the existing redirect/page-based authentication mechanism is automatically used.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a networked computing environment, a method of authenticating client requests utilizing HTTP-based authentication, comprising:
   requesting content from a remote server;
   receiving an HTTP redirect response from the remote server, the HTTP redirect response including information identifying a location corresponding to an authentication server of an authentication service and including authentication data identifying a specified authentication scheme;
   upon recognizing the authentication data included with the HTTP redirect response,
      a) invoking local code corresponding to the specified authentication scheme to obtain credentials locally, and
      b) providing the credentials to the authentication server concurrent with providing an authentication request to the authentication server;
   upon failing to recognize the authentication data included with the HTTP redirect response, providing an authentication request to the authentication server in response to the HTTP redirect response; and
   receiving an authentication ticket from the authentication server, wherein the authentication ticket provides access to the requested content on the remote server.

2. The method of claim 1 wherein requesting content from the remote server comprises issuing an HTTP get request, and wherein receiving a redirect response from the remote server comprises receiving an HTTP 302 response.

3. The method of claim 2 wherein invoking local code corresponding to the specified authentication scheme comprises converting the HTTP 302 response into an HTTP 401 response based on the authentication data in the HTTP 302 response.

4. The method of claim 1 wherein recognizing the authentication data included with the HTTP redirect response comprises evaluating a header of the redirect response.

5. The method of claim 1 wherein invoking local code corresponding to the specified authentication scheme comprises generating an authentication context object.

6. The method of claim 1 wherein invoking local code corresponding to the specified authentication scheme comprises generating a response that simulates an authentication response.

7. The method of claim 1 wherein invoking the local code corresponding to the specified authentication scheme to obtain credentials locally comprises, providing a user interface, and obtaining the credentials via the user interface.

8. The method of claim 1 further comprising, receiving a ticket from the authentication service, providing the ticket to the remote server, and receiving content from the remote server.

9. A computer-readable storage medium having computer-executable instructions for performing a method of authenticating client requests utilizing HTTP-based authentication, comprising:
   requesting content from a remote server;
   receiving an HTTP redirect response from the remote server, the HTTP redirect response including information identifying a location corresponding to an authentication server of an authentication service and including authentication data identifying a specified authentication scheme;
   upon recognizing the authentication data included with the HTTP redirect response,
      a) invoking local code corresponding to the specified authentication scheme to obtain credentials locally, and
      b) providing the credentials to the authentication server concurrent with providing an authentication request to the authentication server;
   upon failing to recognize the authentication data included with the HTTP redirect response, providing an authentication request to the authentication server in response to the HTTP redirect response; and
   receiving an authentication ticket from the authentication server, wherein the authentication ticket provides access to the requested content on the remote server.

10. The computer-readable storage medium of claim 9, wherein requesting content from the remote server comprises issuing an HTTP get request, and wherein receiving a redirect response from the remote server comprises receiving an HTTP 302 response.

11. The computer-readable storage medium of claim 10, wherein invoking local code corresponding to the specified authentication scheme comprises converting the HTTP 302 response into an HTTP 401 response based on the authentication data in the HTTP 302 response.

12. The computer-readable storage medium of claim 9, wherein recognizing the authentication data included with the HTTP redirect response includes evaluating a header of the redirect response.

13. The computer-readable storage medium of claim 9, wherein invoking local code corresponding to the specified authentication scheme comprises generating an authentication context object.

14. The computer-readable storage medium of claim 9, wherein invoking local code corresponding to the specified authentication scheme comprises generating a response that simulates an authentication response.

15. The computer-readable storage medium of claim 9, wherein invoking local code corresponding to the specified authentication scheme to obtain credentials locally comprises, providing a user interface, and obtaining the credentials via the user interface.

16. A computer-readable storage medium having stored thereon a data structure for authenticating client requests utilizing HTTP-based authentication, comprising:
- a first set of data indicating that the data structure is an HTTP redirect response received from a remote server in response to a request to that remote server;
- a second set of data identifying a location to where the request should be redirected; and
- a third set of data corresponding to an authentication scheme;
- wherein the third set of data instructs an updated browser to invoke local authentication code corresponding to the authentication scheme to obtain credentials to be sent concurrent with an authentication request to the location identified in the second set of data, and
- wherein a legacy browser is not capable of recognizing the third set of data, and the first set of data instructs the legacy browser to redirect the request to the location identified in the second set of data.

17. A method of authenticating client requests utilizing HTTP-based authentication, including requests from a first client having updated browser code and a second client having legacy browser code, comprising:
- receiving initial requests for content from both the first and second clients; and
- in response to the initial requests, sending both the first and second clients an identical HTTP redirect response including:
  - information identifying a location corresponding to an authentication server of an authentication service, and
  - authentication data identifying a specified authentication scheme;
- wherein the updated browser code detects the authentication data in the HTTP redirect response and instructs the first client to invoke local code corresponding to the specified authentication scheme to obtain credentials locally and provide the credentials to the authentication server concurrent with an authentication request;
- wherein the legacy browser code of the second client fails to detect the authentication data in the HTTP redirect response and redirects the initial request to the authentication server; and
- wherein both the first and second clients receive an authentication ticket from the authentication server, the authentication ticket providing access to the requested content.

18. The method of claim 17 wherein the local code obtains the credentials from a storage location.

19. The method of claim 17 wherein the local code obtains the credentials by providing a user interface.

20. The method of claim 17 wherein the updated browser code communicates with the local code via an authentication context object.

21. The method of claim 17 wherein the updated browser code invokes the local code by converting the HTTP redirect response to an authentication response.

22. The method of claim 21 wherein the HTTP redirect response comprises an HTTP 302 response and the authentication response comprises an HTTP 401 response.

23. The method of claim 17 wherein the updated browser code detects the authentication data in a header of the HTTP redirect response.

24. The method of claim 17 wherein, in response to redirecting the initial request to the authentication server, the authentication server sends a request for credentials to the second client.

* * * * *